(12) United States Patent
Miklós et al.

(10) Patent No.: US 9,578,557 B2
(45) Date of Patent: Feb. 21, 2017

(54) DELAYED HANDOVER SIGNALLING IN A MOBILE NETWORK

(75) Inventors: György Miklós, Pilisborosjenö (HU); János Harmatos, Budapest (HU); John Stenfelt, Göteborg (SE); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/412,890

(22) PCT Filed: Jul. 6, 2012

(86) PCT No.: PCT/EP2012/063304
§ 371 (c)(1),
(2), (4) Date: Jan. 5, 2015

(87) PCT Pub. No.: WO2014/005653
PCT Pub. Date: Jan. 9, 2014

(65) Prior Publication Data
US 2015/0131615 A1 May 14, 2015

(51) Int. Cl.
*H04W 36/00* (2009.01)

(52) U.S. Cl.
CPC ..... *H04W 36/0055* (2013.01); *H04W 36/0011* (2013.01)

(58) Field of Classification Search
CPC ...... H04W 24/02; H04W 24/04; H04W 28/12; H04W 36/00; H04W 36/0005; H04W 36/0011; H04W 36/0016; H04W 36/0022; H04W 36/0033; H04W 36/0055; H04W 36/0094; H04W 36/02; H04W 36/023; H04W 36/08; H04W 36/14; H04W 36/18; H04W 36/24; H04W 40/24; H04W 60/00; H04W 76/02; H04W 76/06; H04W 76/064; H04W 76/068; H04W 84/045; H04W 88/16; H04W 92/20; H04W 36/0083; H04W 36/0066; H04W 36/16; H04W 40/36; H04W 48/20; H04W 60/04; H04W 76/04; H04L 29/0621; H04L 47/32; H04L 1/1848; H04B 7/18539
See application file for complete search history.

(56) References Cited

U.S. PATENT DOCUMENTS 7,272,123 B2 * 9/2007 Wall ................. H04W 36/0033
                                                    370/331
7,697,489 B1    4/2010 Apte et al.
(Continued)

FOREIGN PATENT DOCUMENTS

CA    WO 2011057055 A1 *   5/2011   ............ H04W 36/22
EP    1 519 519 A1          3/2005
(Continued)

OTHER PUBLICATIONS

International Search Report for International Application No. PCT/EP2012/063304 mailed Apr. 16, 2013, 6 pages.
(Continued)

*Primary Examiner* — Michael Thier
*Assistant Examiner* — Eric Nowlin
(74) *Attorney, Agent, or Firm* — Myers Bigel, P.A.

(57) ABSTRACT

In a mobile network comprising a plurality of base stations and a gateway, a user equipment may perform a handover from a source base station to a target base station. By control signalling, the handover may be notified from the target base station to a control node of the mobile network and then to the gateway so that the gateway may switch to a data path which connects the target base station and the gateway. The notification of the handover may be delayed at the target base station or at the control node, by starting a timer and
(Continued)

sending the control signalling for initiating the path switching after expiry of the timer.

16 Claims, 17 Drawing Sheets

(56) References Cited

U.S. PATENT DOCUMENTS

| | | | | |
|---|---|---|---|---|
| 8,554,228 B2* | 10/2013 | Bontu | ............... | H04W 36/0072 455/438 |
| 8,725,149 B2* | 5/2014 | Motegi | ................ | H04W 36/02 370/331 |
| 8,902,852 B2* | 12/2014 | Jaiswal | ............... | H04W 36/023 370/331 |
| 9,467,910 B2* | 10/2016 | Laganier | ........... | H04W 36/0083 |
| 2003/0003912 A1* | 1/2003 | Melpignano | ...... | H04W 36/0055 455/436 |
| 2008/0051091 A1* | 2/2008 | Phan | ..................... | H04W 36/08 455/436 |
| 2009/0029706 A1* | 1/2009 | Prakash | ................ | H04L 1/0061 455/436 |
| 2009/0061876 A1* | 3/2009 | Ho | ........................ | H04W 99/00 455/436 |
| 2009/0109926 A1* | 4/2009 | Meylan | ................. | H04W 36/02 370/331 |
| 2009/0124259 A1* | 5/2009 | Attar | ....................... | H04L 47/10 455/436 |
| 2009/0131056 A1* | 5/2009 | Bontu | ............... | H04W 36/0072 455/436 |
| 2009/0185539 A1* | 7/2009 | Ohta | ..................... | H04W 36/02 370/331 |
| 2009/0190554 A1* | 7/2009 | Cho | ..................... | H04L 1/1874 370/331 |
| 2010/0062774 A1* | 3/2010 | Motegi | ................. | H04W 36/02 455/437 |
| 2011/0014937 A1* | 1/2011 | Takata | .............. | H04W 36/0055 455/509 |
| 2011/0075633 A1* | 3/2011 | Johansson | ............. | H04W 36/02 370/331 |
| 2011/0242986 A1* | 10/2011 | Balasubramanian | | H04L 41/5025 370/242 |
| 2012/0142352 A1* | 6/2012 | Zhang | ............... | H04W 36/0072 455/436 |
| 2012/0233635 A1* | 9/2012 | Hakola | ................ | H04W 12/02 725/25 |
| 2012/0294276 A1* | 11/2012 | Jaiswal | ............... | H04W 36/023 370/331 |
| 2012/0294277 A1* | 11/2012 | Jaiswal | ............... | H04W 36/023 370/331 |
| 2012/0315907 A1* | 12/2012 | Chin | ..................... | H04W 36/22 455/436 |
| 2014/0003357 A1* | 1/2014 | Ejzak | .................. | H04W 76/021 370/329 |
| 2014/0011510 A1* | 1/2014 | Balck | .................. | H04W 76/066 455/452.1 |
| 2015/0223106 A1* | 8/2015 | Van Phan | ............... | H04L 29/14 370/225 |
| 2015/0237516 A1* | 8/2015 | Michel | ............. | H04W 36/0094 370/252 |
| 2015/0237533 A1* | 8/2015 | Keskitalo | .......... | H04W 36/0011 370/331 |
| 2015/0237671 A1* | 8/2015 | Wu | ..................... | H04W 76/043 370/328 |
| 2015/0319665 A1* | 11/2015 | Bonneville | ....... | H04W 36/0038 455/411 |
| 2015/0327127 A1* | 11/2015 | Centonza | .......... | H04W 36/0055 455/436 |

FOREIGN PATENT DOCUMENTS

| | | |
|---|---|---|
| EP | 1 833 274 A1 | 9/2007 |
| WO | WO 2009/067637 A1 | 5/2009 |
| WO | WO 2012/037958 A1 | 3/2012 |

OTHER PUBLICATIONS

Written Opinion of the International Searching Authority for International Application No. PCT/EP2012/063304 mailed Apr. 16, 2013, 4 pages.

3GPP TS 23.401 V11.2.0 (Jun. 2012) "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)", 650 Route des Lucioles, Sophia Antipolis, Valbonne, France; 285 pages.

3GPP TS 36.300 V11.2.0 (Jun. 2012) "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 650 Route des Lucioles, Sophia Antipolis, Valbonne, France; 201 pages.

3GPP TS 29.274 V11.3.0 (Jun. 2012) "3$^{rd}$ Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 650 Route des Lucioles, Sophia Antipolis, Valbonne, France; 219 pages.

* cited by examiner

DELAYED HANDOVER SIGNALLING IN A MOBILE NETWORK

CROSS REFERENCE TO RELATED APPLICATION

This application is a 35 U.S.C. §371 national stage application of PCT International Application No. PCT/EP2012/063304, filed on 6 Jul. 2012, the disclosure and content of which is incorporated by reference herein in its entirety. The above-referenced PCT International Application was published in the English language as International Publication No. WO 2014/005653 A1 on 9 Jan. 2014.

TECHNICAL FIELD

The present invention relates to methods for handover signalling in a mobile network and to corresponding devices.

BACKGROUND

In mobile networks, e.g., as specified by the $3^{rd}$ Generation Partnership Project (3GPP), it is known to perform a handover in the Radio Access Network (RAN) and then inform a core network of the executed handover. For example 3GPP Technical Specification (TS) 23.401 defines that in a mobile network according to the specifications of 3GPP LTE (Long Term Evolution), a handover is executed in the LTE RAN, using signalling between the user equipment (UE), and the involved base stations, referred to as source eNB (evolved Node B) and target eNB. Once the handover is executed and the UE connects to the target eNB, the target eNB notifies the handover to the core network, referred to as EPC (Evolved Packet Core). This is accomplished by signalling to a control node referred to as MME (Mobility Management Entity). The MME then handles switching to a user plane data path which connects the target eNB with a serving gateway (SGW).

The above handover mechanism may result in significant signalling load at the MME and/or the SGW. This is particularly true for deployments where the number of handovers is high due to the small cells and high mobility of UEs, or due to the sensitive handover threshold settings in the RAN which result in handovers even at a slight change in the measured radio link characteristics.

Accordingly, there is a need for solutions which allow for efficient handover signalling in a mobile network.

SUMMARY

According to an embodiment of the invention, a method of signalling a handover of a UE in a mobile network is provided. According to the method, a node of the mobile network starts a timer. This is accomplished in response to a handover of the UE from a source base station to a target base station. After expiry of the timer, the node sends control signalling for initiating switching to a data path which connects the target base station and a gateway of the mobile network.

According to a further embodiment of the invention, a node of a mobile network is provided. The node comprises an interface for signalling a handover of a UE and a processor. The processor is configured to start a timer in response to a handover of the UE from a source base station to a target base station. Further, the processor is configured to control the interface to send, after expiry of the timer, control signalling for initiating switching to a data path which connects the target base station and the gateway.

DETAILED DESCRIPTION OF EMBODIMENTS

In the following, the invention will be explained in more detail by referring to exemplary embodiments and to the accompanying drawings. The illustrated embodiments relate to handover signalling in a mobile network. In the illustrated examples, it is assumed that the mobile network is implemented on the basis of 3GPP LTE radio access technology. However, it is to be understood that other types of radio access technology could be used as well, e.g., Global System for Mobile Communications (GSM) or Universal Mobile Telecommunications System (UMTS).

Figure 1:
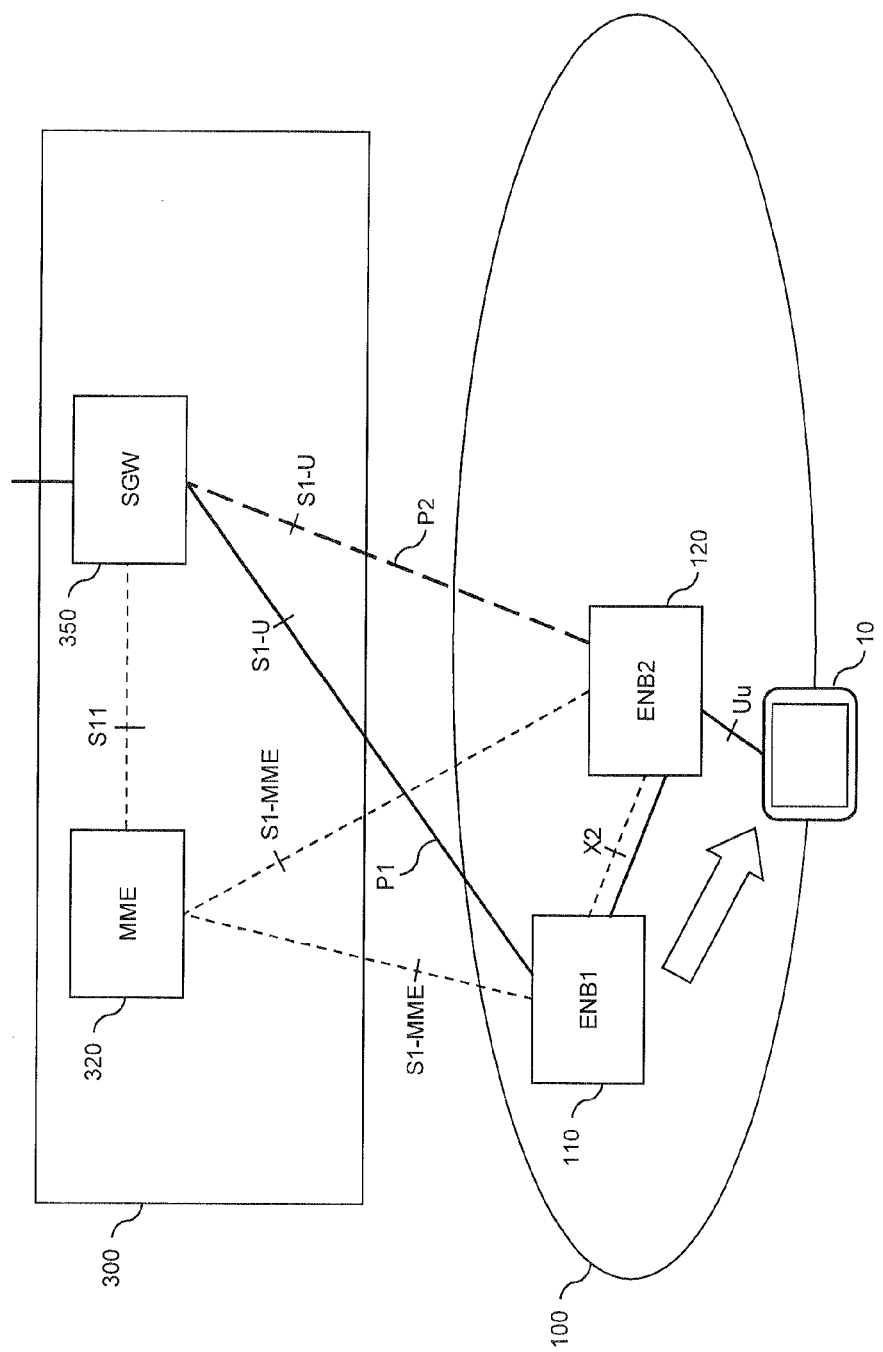
FIG. 1 schematically illustrates a handover scenario according to an embodiment of the invention.

FIG. 1 schematically illustrates a handover scenario in the mobile network. More specifically, FIG. 1 illustrates a RAN 100 and a core network 300 of the mobile network. The RAN includes a first base station (BS) 110 and a second BS 120. The core network 300 includes a control node 320 and a gateway 350. In accordance with the illustrated LTE scenario, the first BS 110 and the second BS 120 are implemented as eNBs, the control node 320 is implemented as MME, and the gateway 350 is implemented as SGW.

Further, FIG. 1 illustrates a UE 10. The UE 10 may be a portable communication device, such as a mobile phone, portable computer, or the like. The UE 10 may connect to the first or second BS 110, 120 so as to transmit user plane data to a packet network connected to the gateway 350 and/or receive user plane data from the packet network. If the UE 10 is connected to the first BS 110, typically a first data path P1 between the first BS 110 and the gateway 350 is used for conveying the user plane data to or from the packet network. If the UE 10 is connected to the second BS 120, typically a second data path P2 between the second BS 120 and the gateway 350 is used for conveying the user plane data to or from the packet network. In the illustrated LTE scenario, the first data path P1 may be implemented using a S1-U interface between the first BS 110 and the gateway 350, and the second data path P2 may be implemented using a S1-U interface between the second BS 120 and the gateway 350. For conveying the user plane data between the UE 10 and the first BS 110 or the second BS 120, a radio interface is used, in the illustrated LTE scenario referred to as Uu interface.

Further, the first BS 110 and the second BS 120 may also perform control signalling with respect to the control node 320, i.e., transmit control data to the control node 320 and receive control data from the control node 320. For conveying the control plane data, an S1-MME interface between the first BS 110 and the control node 320 and an S1-MME interface between the second BS 120 and the control node 320 may be used.

The first BS 110 and the second BS 120 may also communicate with each other using an inter-BS interface, in the illustrated LTE scenario referred to as X2 interface. The inter-BS interface may be used for conveying user plane data and/or control data.

In the scenario of FIG. 1, a situation after a handover of the UE 10 from the first BS 110 to the second BS 120 is illustrated. Concerning this handover, the first BS 110 may be referred to as a source BS, and the second BS 120 may be referred to as a target BS. Having executed the handover, the mobile network may switch from using the first data path P1 for conveying the user plane data to using the second data path P2 for conveying the user plane data. After executing the handover, this path switching is initiated by control signalling between the target BS 110 and the control node 320, and by control signalling between the control node 320 to the gateway 350. After executing the handover, but before switching to the second path P2, the mobile network may continue using the first data path for conveying the user plane data. For this purpose, the user plane data may be forwarded between the first BS 110 and the second BS 120, using the inter-BS interface.

According to concepts as illustrated in the following, control signalling for initiating the path switching is delayed for a certain delay time period T, using a corresponding timer. The delay time period T may be configurable, e.g., using operations and maintenance (OAM) procedures. In this way, the gateway 350 is not notified of every handover and the signalling load between the RAN 100 and the core network 300 and/or within the core network 300 may be reduced. In particular, if there are multiple handovers during the delay time period T, control signalling between the target BS to the control node 320 and/or between the control node and the gateway 350 only needs to be performed for the last handover. Further, if the UE 10 returns to the source BS of the first handover, also control signalling for the last handover can be omitted. Accordingly, the concepts allow for hiding certain handovers from the control node 320 and/or from the gateway 350, thereby improving efficiency of control signalling.

In some implementations, the delay and the corresponding timer may be implemented in the control node 320. In this case, the target BS may notify the handover to the control node 320. After expiry of the timer, the control node 320 may then notify the gateway 350. This reduces the signalling load between the control node 320 and the gateway 350. In this case, downlink user plane data may be forwarded from the source BS to the target BS until the path switching is executed. Control plane data between the RAN 100 and the core network 300 may in turn be conveyed using the interface between the target BS and the control node 320.

In some implementations, the delay and the corresponding timer may be implemented in the RAN 100, in particular in the target BS. In this case, the target BS notifies the handover to the control node after expiry of the timer. The control node 320 may then proceed with notifying the gateway 350. This reduces the signalling load also between the RAN 100 and the control node 320. In this case, also control plane data may be forwarded between the source BS and the target BS.

Figure 2:
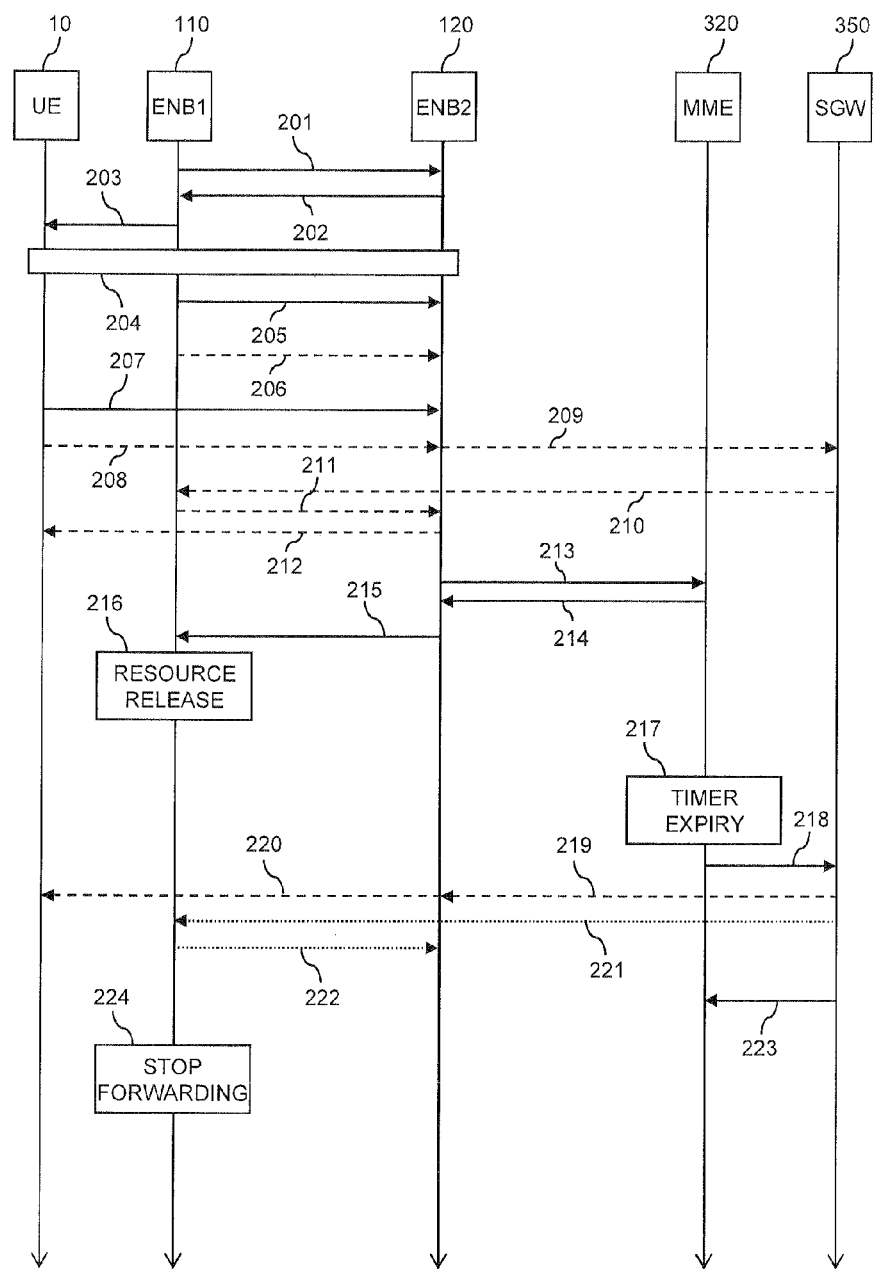
FIG. 2 shows a timing diagram for illustrating exemplary procedures involving handover signalling according to an embodiment of the invention.

FIG. 2 shows a timing diagram for illustrating procedures in a handover scenario as illustrated in FIG. 1. The procedures involve the UE 10, the source BS 110, the target BS 120, the control node 320, and the gateway 350. In the scenario of FIG. 2, notifying the gateway 350 of a handover of the UE 10 from the source BS 110 to the target BS 120 is delayed at the control node 320, and forwarding of downlink user plane data from the source BS 110 to the target BS 120 takes place until the gateway 350 is notified of the handover and switches to the second data path P2 established using the interface between the target BS 120 and the gateway 350.

In the procedures of FIG. 2, the handover from the source BS 110 to the target BS 120 is prepared by messages 201 and 202. Message 201 may be a handover request from the source BS 110 to the target BS 120, and message 202 may be a handover request acknowledgement form the target BS 120 to the source BS 110, in accordance with 3GPP TS 36.300.

By sending message 203 to the UE 10, the source BS 110 then initiates execution of the handover. In accordance with 3GPP TS 36.300, message 203 may be a Radio Resource Control (RRC) connection reconfiguration message and convey mobility control information to the UE 10. As illustrated by step 204, the UE 10 may then detach from the cell of the source BS 110 and synchronize to the cell of the target BS 120. The source BS 110 may then send status information to the target BS 120, using message 205.

As illustrated by message 205, the source BS 110 may then start forwarding downlink user plane data to the target BS 120.

By sending message 207 to the target BS 120, the UE 10 then sets up a connection to the target BS 120. After this, uplink user plane data can be conveyed directly via the target BS 120 to the gateway 350, as illustrated by messages 208 and 209, while downlink user plane data can be conveyed from the gateway 350 to the source BS 110 and then forwarded via the target BS 120 to the UE 10, as illustrated by messages 210 to 212.

By sending message 213 to the control node 320, the target BS 120 then requests path switching to the second data path P2 established using the interface between the target BS 120 and the gateway 350. The message 213 may be a path switch request in accordance with 3GPP TS 23.401 and 36.300. At this point, rather than immediately notifying the gateway 350, the control node 320 starts a timer having a duration which corresponds to the delay time period T for delaying notification of the handover to the gateway 350. The duration of the timer, i.e., the delay time period T, may be configurable, e.g., through OAM procedures. By message 214, the control node 320 acknowledges the path switch request of message 213.

Upon receiving message 214, the target BS 120 initiates releasing of UE resources at the source BS 110 by sending message 215 to the source BS 110. Message 215 may be UE context release message in accordance with 3GPP TS 23.401 and 36.300.

Upon receiving message 215, the source BS 110 releases resources related to the UE 10, as indicated by step 216. However, the source BS 110 keeps sufficient state information to continue forwarding downlink user plane data of the UE 10. In accordance with the illustrated concepts, the source BS 110 is configured to continue with packet forwarding for a forwarding time period $T_f$ which is longer than the delay time period T for delaying the control signalling to the gateway 350. For this purpose, a forwarding timer of duration $T_f$ may be started together with the forwarding of user plane data by the source BS 110, i.e., upon sending message 206. The forwarding time period $T_f$ may be configurable, e.g., through OAM procedures. Alternatively or additionally, the use of the longer forwarding time period $T_f$ may be negotiated by the control node 320 and the BS 110 during the setup of the connection therebetween. It may also be possible for the control node 320 to store information indicating which BS supports a sufficiently long forwarding time period $T_f$ and to apply the delaying of the handover notification to the gateway only of the source BS 110 supports such a sufficiently long forwarding time period $T_f$. The control node 320 may learn such information form the BSs and/or may be configured with such information in advance, e.g., on a per Tracking Area Identity (TAI) basis, or on a per network domain network domain basis.

At step 217, the timer expires. In the scenario of FIG. 2, it is assumed that the timer expires before the control node 320 receives an indication of the UE 10 having executed a further handover.

After expiry of the timer, the control node 320 notifies the gateway 350 of the handover. This is accomplished by sending message 218 to the gateway 350. Message 218 may be a Modify Bearer Request message in accordance with 3GPP TS 23.401. Upon receiving the message 218, the gateway 350 switches conveying of user plane data to the second data path P2 of FIG. 1. Accordingly, as illustrated by messages 219 and 220, downlink user plane data are no longer conveyed via the source BS 110.

For facilitating packet reordering, the gateway 350 may then send an end marker via the source BS 110 to the target BS 120, as illustrated by messages 221 and 222. The sending of the end marker may be accomplished in accordance with 3GPP TS 23.401 and 36.300.

By sending message 223 to the control node 320, the gateway 350 then responds to the notification of message 218. Message 223 may be a Modify Bearer Response accordance with 3GPP TS 23.401.

At step 224, the source BS 110 stops forwarding of user plane data. This may be accomplished in response to detecting the end marker of message 221 or upon expiry of the forwarding timer of duration $T_f$. Having stopped forwarding user plane data, the source BS 110 may also release the resources associated with the forwarding of user plane data.

Figure 3:
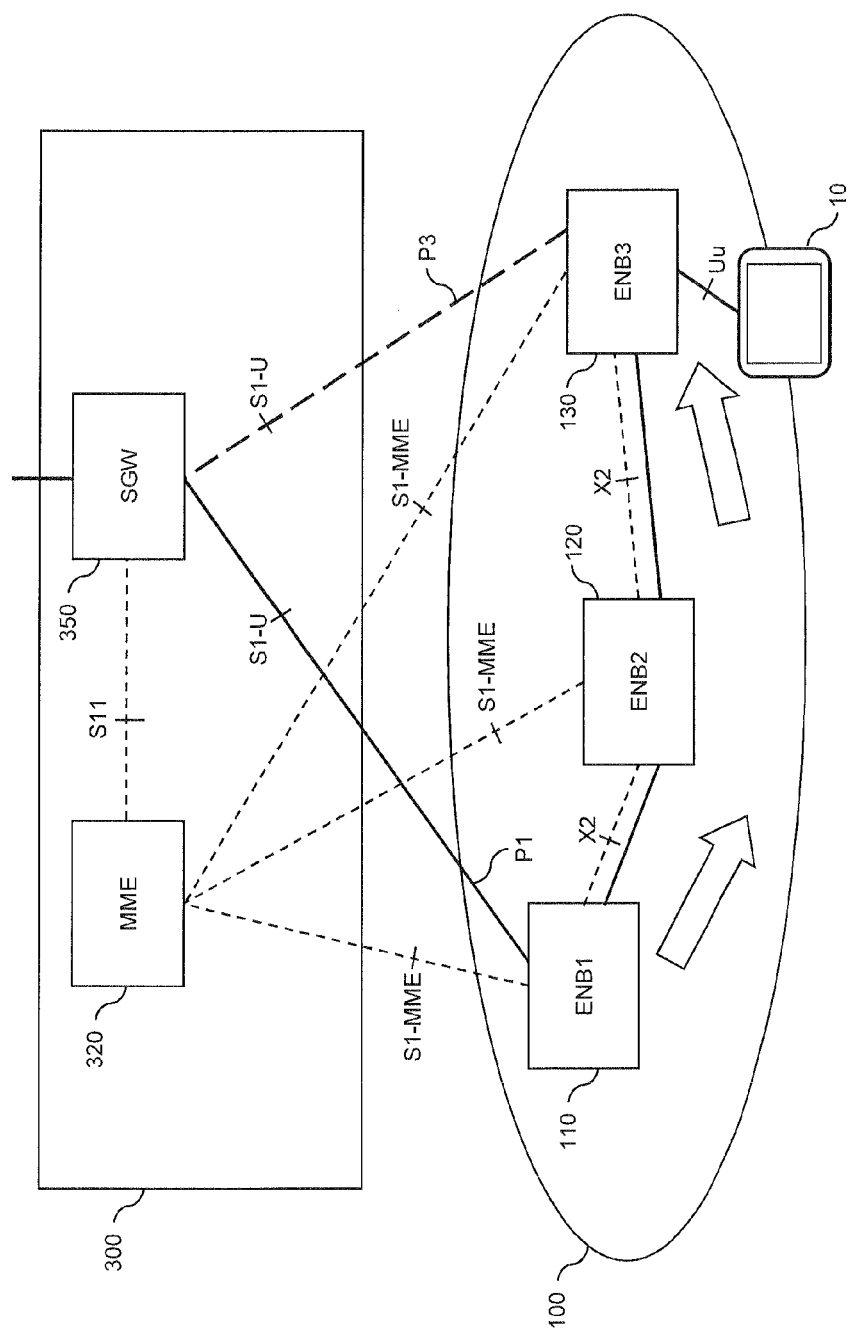
FIG. 3 schematically illustrates a further handover scenario according to an embodiment of the invention.

FIG. 3 schematically illustrates a further handover scenario. The scenario of FIG. 3 generally corresponds to that of FIG. 1, but involves a third BS 130 and a sequence of a first handover from the first BS 110 to the second BS 120 and a second handover from the second BS 120 to the third BS 130. A third data path P3 is established between the third BS 130 and the gateway 350. Like in the case of the first data path and second data path P2, the third data path may use an S1-U interface between the third BS 130 and the gateway 350. With respect to the first handover, the first BS 110 is the source BS and the second BS 120 is the target BS. With respect to the second handover, the second BS 120 is the source BS and the third BS 130 is the target BS. In such a scenario, the multiple handovers of the sequence may be executed within the delay time period T started upon execution of the first handover. In this case, typically only the last handover of the sequence would be notified to the gateway 350, and forwarding of downlink user plane data may be accomplished from the source BS of the first handover in the sequence, i.e., the first BS 110, via the target BS of the first handover, i.e. the second BS 120, to the target BS of the last handover in the sequence, i.e., the third BS 130.

In the scenario of FIG. 3, the forwarding of the user plane data between the first BS 110 and the third BS 130 is accomplished by chaining the BSs of the handover sequence. That is to say, each source BS of the sequence forwards downlink user plane data to the its associated target BS. In the scenario of FIG. 3, the first BS 110 forwards downlink user plane data to the second BS 120 using the inter-BS interface between the first BS 110 and the second BS 120, and the second BS 120 forwards downlink user plane data to the third BS 130, using an inter-BS interface between the second BS 120 and the third BS 130. As illustrated, the inter-BS interfaces may be implemented as X2 interfaces.

Figure 4:
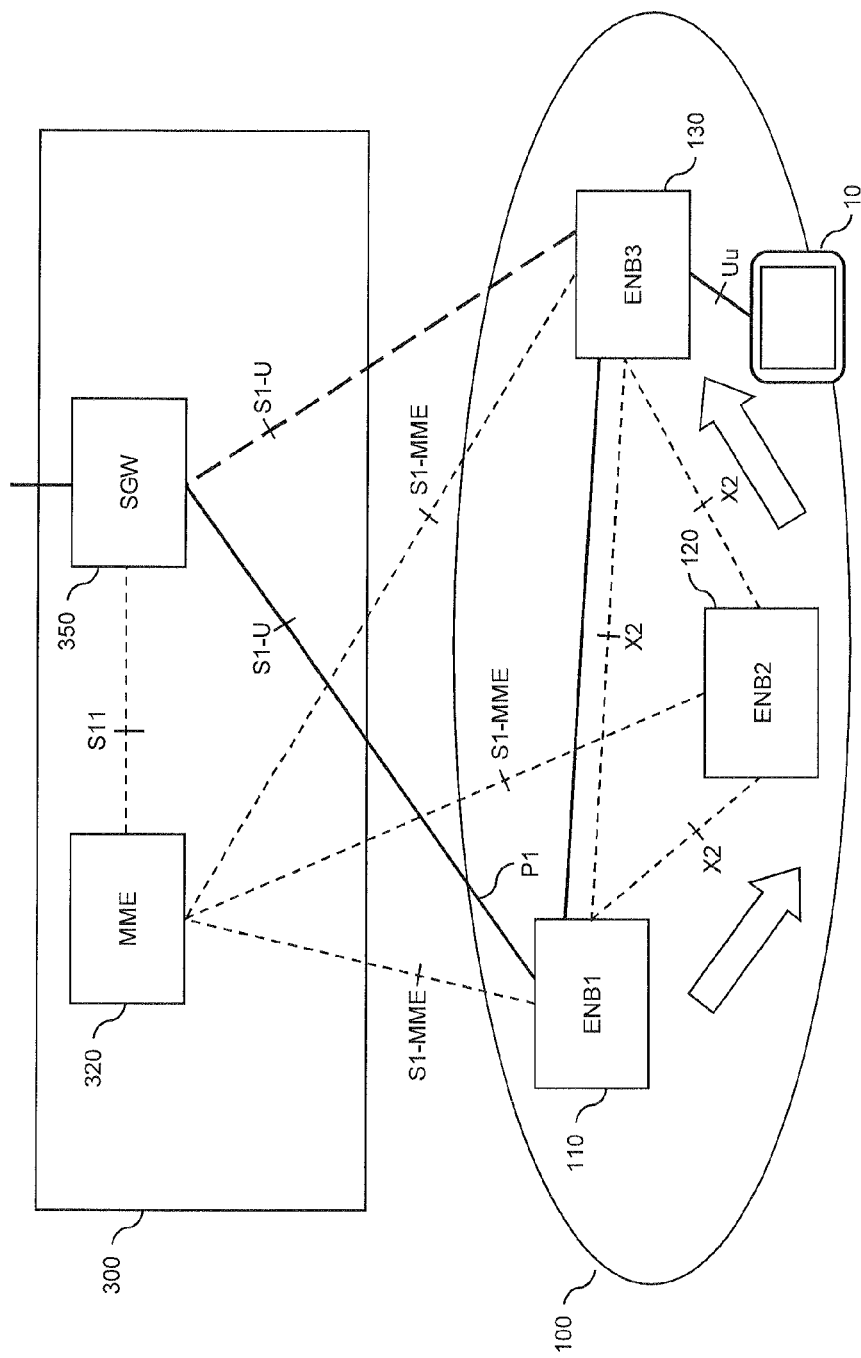
FIG. 4 schematically illustrates a further handover scenario according to an embodiment of the invention.

An alternative arrangement for forwarding the user plane data is illustrated in FIG. 4. In this case, anchoring of the user plane data traffic in the source BS of the first handover of the sequence is used. This means that the source BS of the first handover of the sequence forwards the user plane data directly to the target BS of the last handover of the sequence, using a corresponding inter-BS interface therebetween. In the scenario of FIG. 3, an X2 interface between the first BS 110 and the third BS 130 is assumed. However, also other types of inter-BS interfaces could be used. As compared to the chaining of FIG. 3, the anchoring of FIG. 4 may provide lower load on the inter-BS interfaces due to forwarding.

Figure 5:
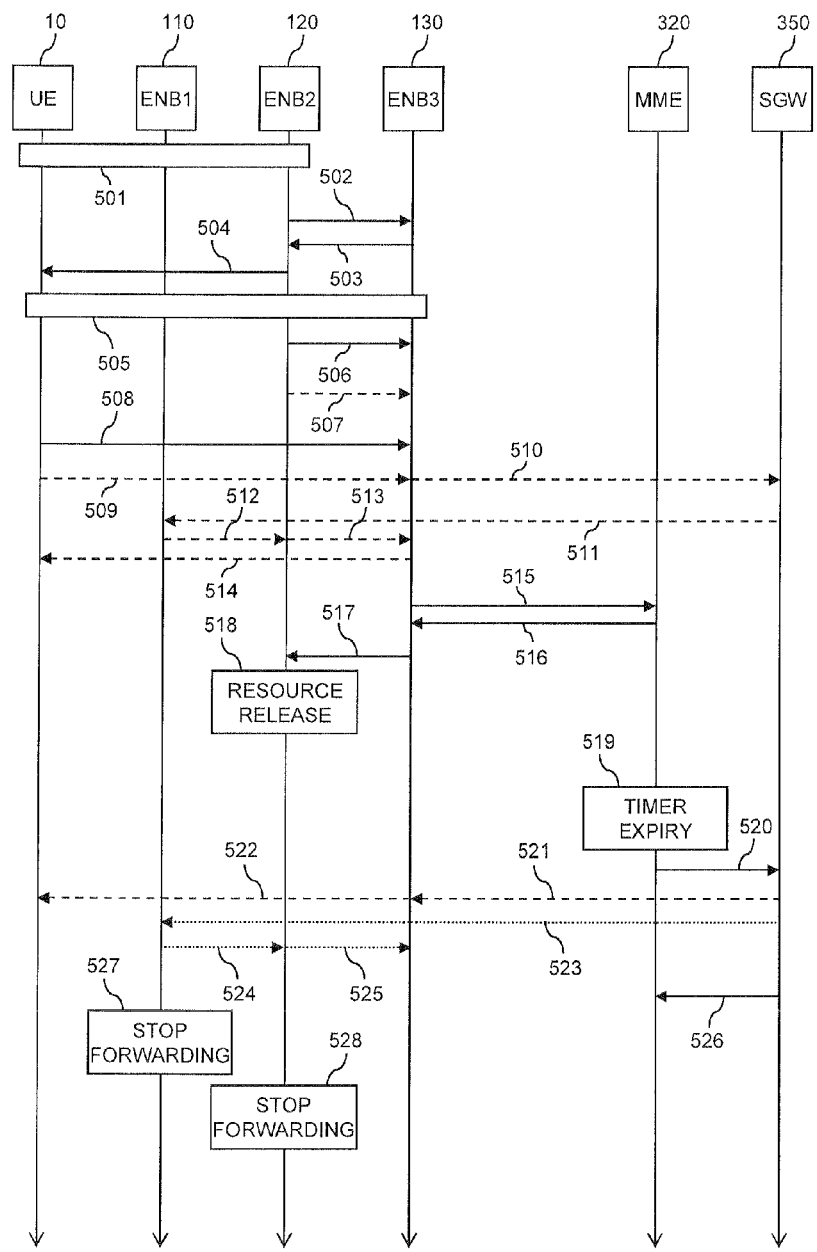
FIG. 5 shows a timing diagram for illustrating further exemplary procedures involving handover signalling according to an embodiment of the invention.

FIG. 5 shows a timing diagram for illustrating procedures in a handover scenario as illustrated in FIG. 3. The procedures involve the UE 10, the first BS 110, the second BS 120, the third BS 130, the control node 320, and the gateway 350. In the scenario of FIG. 5, notifying the gateway 350 of the first handover and the second handover is delayed at the control node 320, thereby avoiding notification of the first handover. Forwarding of user plane data between the first BS 110 and the third BS 130 is accomplished via the second BS 120 and takes place until the gateway 350 is notified of the second handover and switches to the third data path P3 established using the interface between the third BS 130 and the gateway 350.

At step 501, the first handover from the first BS 110 to the second BS 120 is prepared and executed. This may be accomplished as explained in connection with messages and steps 201 to 216 of FIG. 2. However, as compared to FIG. 2 it is now assumed that the second handover from the second BS 120 to the third BS 130 is notified to the control node 320 before expiry of the timer started upon notification of the first handover.

In the procedures of FIG. 5, the handover from the second BS 120 to the third BS 130 is prepared by messages 502 and 503. Message 502 may be a handover request from the second BS 120 to the third BS 130, and message 503 may be a handover request acknowledgement form the third BS 130 to the second BS 120, in accordance with 3GPP TS 36.300.

By sending message 504 to the UE 10, the second BS 120 then initiates execution of the second handover. In accordance with 3GPP TS 36.300, message 504 may be a RRC connection reconfiguration message and convey mobility control information to the UE 10. As illustrated by step 505, the UE 10 may then detach from the cell of the second BS 120 and synchronize to the cell of the third BS 130. The second BS 120 may then send status information to the third BS 130, using message 506.

As illustrated by message 507, the second BS 120 may then start forwarding downlink user plane data to the third BS 130. Here, it is to be understood that it is the first BS 110 which in turn forwards such downlink user plane data to the second BS 120.

By sending message 508 to the third BS 130, the UE 10 then sets up a connection to the third BS 130. After this, uplink user plane data can be conveyed directly via the third BS 130 to the gateway 350, as illustrated by messages 509 and 510, while downlink user plane data can be conveyed from the gateway 350 to the first BS 110 and then forwarded via the second BS 120 and the third BS 130 to the UE 10, as illustrated by messages 511 to 514.

By sending message 515 to the control node 320, the third BS 130 then requests path switching to the third data path P3 established using the interface between the third BS 130 and the gateway 350. The message 515 may be a path switch request in accordance with 3GPP TS 23.401 and 36.300. At this point, rather than immediately notifying the gateway 350, the control node 320 again restarts the timer with duration T for delaying notification of the second handover to the gateway 350. By message 516, the control node 320 acknowledges the path switch request of message 515.

Upon receiving message 516, the third BS 130 initiates releasing of UE resources at the second BS 120 by sending message 517 to the second BS 120. Message 517 may be UE context release message in accordance with 3GPP TS 23.401 and 36.300.

Upon receiving message 517, the second BS 120 releases resources related to the UE 10, as indicated by step 518. However, the second BS 120 keeps sufficient state information to continue forwarding downlink user plane data of the UE 10. In accordance with the illustrated concepts, the second BS 120 is configured to continue with packet forwarding for a forwarding time period $T_f$ which is longer than the delay time period T for delaying the control signalling to the gateway. For this purpose, a forwarding timer of duration $T_f$ may be started together with the forwarding of user plane data by the second BS 120, i.e., upon sending message 507. The forwarding time period $T_f$ and the corresponding forwarding timer may be configured in a similar manner as explained in connection with step 216 of FIG. 2.

Until this point, the gateway 350 was not notified of the first handover or the second handover because the delay time period of T has not expired since the last handover notified to the control node 320. Accordingly, forwarding of downlink user plane data as illustrated by messages 511 to 514 continues.

At step 519, the timer expires. In the scenario of FIG. 5, it is assumed that the timer expires before the control node 320 receives an indication of the UE 10 having executed a still further handover.

After expiry of the timer, the control node 320 notifies the gateway 350 of the second handover. This is accomplished by sending message 520 to the gateway 350. Message 520 may be a Modify Bearer Request message in accordance with 3GPP TS 23.401. Upon receiving the message 520, the gateway 350 switches conveying of user plane data to the third data path P3 of FIG. 3. Accordingly, as illustrated by messages 521 and 522, downlink user plane data are no longer conveyed via the first BS 110 and the second BS 120.

For facilitating packet reordering, the gateway 350 may then send an end marker via the first BS 110 and the second BS 120 to the third BS 130, as illustrated by messages 523, 524, and 525. The sending of the end marker may be accomplished in accordance with 3GPP TS 23.401 and 36.300.

By sending message 526 to the control node 320, the gateway 350 then responds to the notification of message 520. Message 526 may be a Modify Bearer Response accordance with 3GPP TS 23.401.

At step 527, the first BS 110 stops forwarding of user plane data. This may be accomplished in response to detecting the end marker of message 523 or upon expiry of the forwarding timer of duration $T_f$. Having stopped forwarding user plane data, the first BS 110 may also release the resources associated with the forwarding of user plane data. Similarly, the second BS 120 stops forwarding of user plane data at step 528. This may be accomplished in response to detecting the end marker of message 524 or upon expiry of the forwarding timer of duration $T_f$. Having stopped forwarding user plane data, the second BS 120 may also release the resources associated with the forwarding of user plane data.

In the example of FIG. 5, the handover related signalling between the control node 320 and the gateway 350 is significantly reduced, because the first handover is not notified to the gateway. Instead, only the second handover, which followed the first handover within the delay time period T, is notified. It can be seen that even higher reduction of handover related signalling could be achieved in the case of longer sequences of handovers within the delay time period T. On the other hand, the notification after the delay time period T is useful in view of avoiding too complex routing of user plane traffic and reducing load on the BSs due to traffic forwarding.

A special case of successive handovers during the delay time period T involves the UE 10 returning to the first BS of a sequence of handovers, i.e., to the source BS of the first handover of the sequence. This may for example occur for "ping-pong" handovers when the UE 10 moves from a first BS to a second BS and then back from the second BS to the first BS. However, this may also occur for longer sequences of handovers in which the UE 10 moves to one or more intermediate BSs before returning to the first BS of the sequence.

In such cases, the control node 320 may detect the return of the UE 10 to the first BS of the sequence, and then omit notifying the gateway 350 of the last handover back to the first BS of the sequence. In this way, handover related signalling between the control node 320 and the gateway may be reduced even further.

Figure 6:
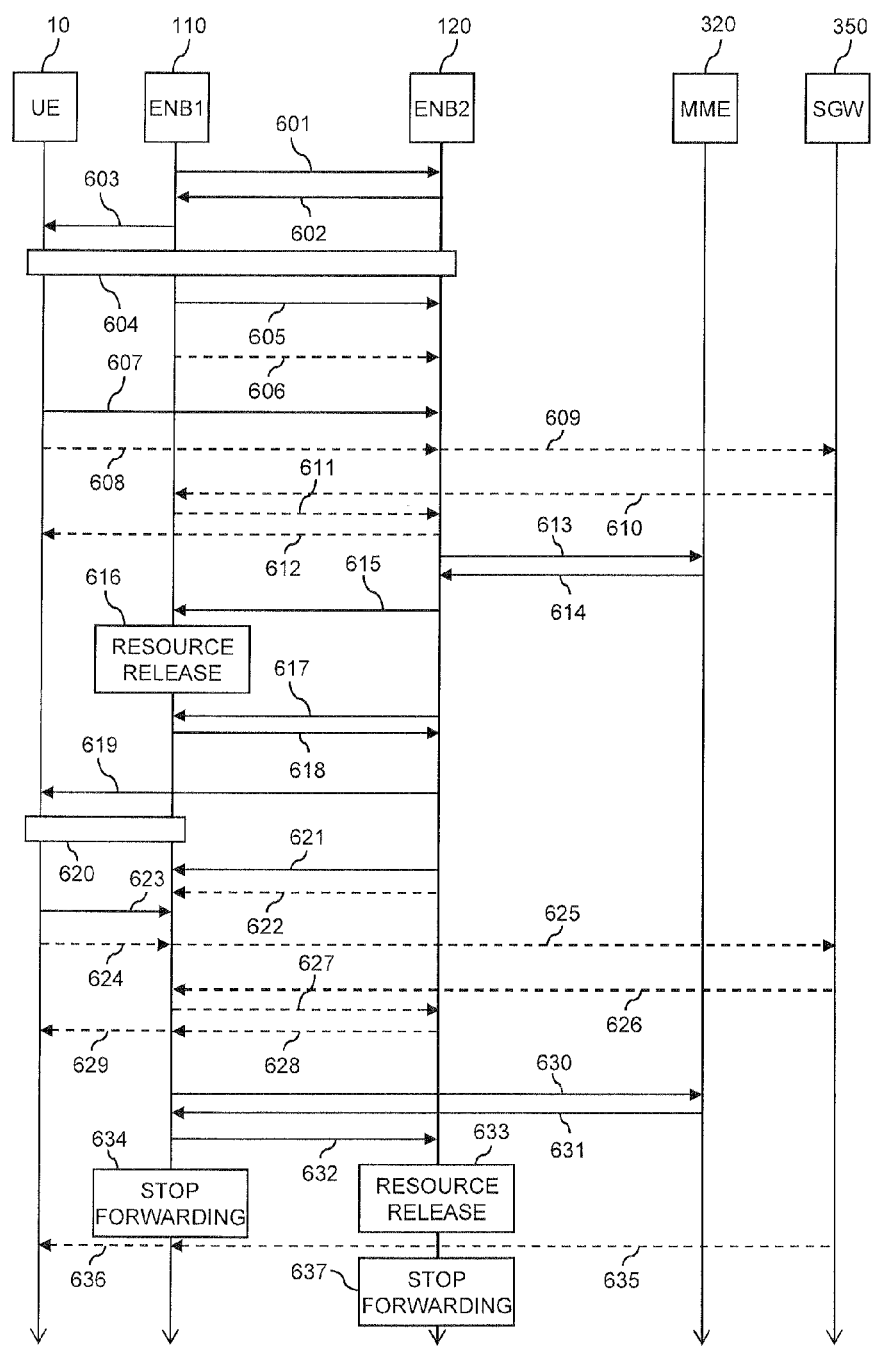
FIG. 6 shows a timing diagram for illustrating further exemplary procedures involving handover signalling according to an embodiment of the invention.

FIG. 6 shows a timing diagram for illustrating procedures in such a ping-pong scenario. The procedures involve the UE 10, the first BS 110, the second BS 120, the control node 320, and the gateway 350, as illustrated in FIG. 1. As compared to FIG. 1, a sequence of handovers is assumed: a first handover of the UE 10 from the first BS 110 to the second BS 120, and a second handover of the UE 10 from the second BS 120 back to the first BS 110. With respect to the first handover, the first BS 110 is the source BS and the second BS 120 is the target BS. With respect to the second handover, the second BS 120 is the source BS and the first BS 110 is the target BS. In the scenario of FIG. 6, notifying the gateway 350 of the handovers is delayed at the control node 320 while forwarding of user plane data is accomplished between the first BS 110 and the second BS 120.

In the procedures of FIG. 6, the first handover from the first BS 110 to the second BS 120 is prepared by messages 601 and 602. Message 601 may be a handover request from the first BS 110 to the second BS 120, and message 602 may be a handover request acknowledgement form the second BS 120 to the first BS 110, in accordance with 3GPP TS 36.300.

By sending message 603 to the UE 10, the first BS 110 then initiates execution of the handover. In accordance with 3GPP TS 36.300, message 603 may be a RRC connection reconfiguration message and convey mobility control information to the UE 10. As illustrated by step 604, the UE 10 may then detach from the cell of the first BS 110 and synchronize to the cell of the second BS 120. The first BS 110 may then send status information to the second BS 120, using message 605.

As illustrated by message 605, the first BS 110 may then start forwarding downlink user plane data to the second BS 120.

By sending message 607 to the second BS 120, the UE 10 then sets up a connection to the second BS 120. After this, uplink user plane data can be conveyed directly via the second BS 120 to the gateway 350, as illustrated by messages 608 and 609, while downlink user plane data can be conveyed from the gateway 350 to the first BS 110 and then forwarded via the second BS 120 to the UE 10, as illustrated by messages 610 to 612.

By sending message 613 to the control node 320, the second BS 120 then requests path switching to the second data path P2 established using the interface between the second BS 120 and the gateway 350. The message 613 may be a path switch request in accordance with 3GPP TS 23.401 and 36.300. At this point, rather than immediately notifying the gateway 350, the control node 320 starts the timer with duration T for delaying notification of the first handover to the gateway 350. Further, the control node 320 stores information identifying the first BS 110 as the first source BS of a potential handover sequence. By message 614, the control node 320 acknowledges the path switch request of message 613.

Upon receiving message 614, the second BS 120 initiates releasing of UE resources at the source BS 110 by sending message 615 to the first BS 110. Message 615 may be UE context release message in accordance with 3GPP TS 23.401 and 36.300.

Upon receiving message 615, the first BS 110 releases resources related to the UE 10, as indicated by step 616. However, the first BS 110 keeps sufficient state information to continue forwarding downlink user plane data of the UE 10. In accordance with the illustrated concepts, the first BS 110 is configured to continue with packet forwarding for the forwarding time period $T_f$ which is longer than the delay time period T for delaying the control signalling to the gateway. For this purpose, a forwarding timer of duration $T_f$ may be started together with the forwarding of user plane data by the source BS 110, i.e., upon sending message 606.

The second handover from the second BS 120 back to the first BS 110 is then prepared by messages 617 and 618. Message 617 may be a handover request from the second BS 120 to the first BS 110, and message 618 may be a handover request acknowledgement form the first BS 110 to the second BS 120, in accordance with 3GPP TS 36.300.

By sending message 619 to the UE 10, the second BS 120 then initiates execution of the second handover. In accordance with 3GPP TS 36.300, message 619 may be a radio resource control connection reconfiguration message and convey mobility control information to the UE 10. As illustrated by step 620, the UE 10 may then detach from the cell of the second BS 120 and synchronize to the cell of the first BS 110. The second BS 120 may then send status information to the first BS 110, using message 621.

As illustrated by message 622, the second BS 120 may then start forwarding downlink user plane data to the first BS 110. Here, it is to be understood that it is the first BS 110 which in turn forwards such downlink user plane data to the second BS 120.

By sending message 623 to the first BS 110, the UE 10 then again sets up a connection to the first BS 110. After this, uplink user plane data can be conveyed directly via the first BS 110 to the gateway 350, as illustrated by messages 624 and 625, while downlink user plane data can be conveyed from the gateway 350 to the first BS 110 and then forwarded via the first BS 110, the second BS 120, and then again the first BS 110 to the UE 10, as illustrated by messages 626 to 629.

By sending message 630 to the control node 320, the first BS 110 then requests path switching to the first data path P1. The message 630 may be a path switch request in accordance with 3GPP TS 23.401 and 36.300. In the scenario of FIG. 6, it is assumed that the timer started upon notification of the first handover by message 613 has not yet expired at this point. Accordingly, the control node 320 skips notifying the first handover to the gateway 350. Further, on the basis of the information identifying the first BS 110 as the first source BS of the handover sequence, the control node 320 also skips notifying the second handover to the gateway 350, irrespective of expiration of the delay time period T starting at notification of the second handover to the control node 320.

Upon receiving message 631, the first BS 110 initiates releasing of UE resources at the second BS 120 by sending message 632 to the second BS 120. Message 632 may be UE context release message in accordance with 3GPP TS 23.401 and 36.300.

Upon receiving message 632, the second BS 120 releases resources related to the UE 10, as indicated by step 633. However, the second BS 120 keeps sufficient state information to continue forwarding downlink user plane data of the UE 10. In accordance with the illustrated concepts, the second BS 120 is configured to continue with packet forwarding for the forwarding time period $T_f$ which is longer than the delay time period T for delaying the control signalling to the gateway. For this purpose, a forwarding timer of duration $T_f$ may be started together with the forwarding of user plane data by the second BS 120, i.e., upon sending message 622.

At step 634, the first BS 110 stops forwarding of user plane data. This may be accomplished upon expiry of the forwarding timer of duration $T_f$. Having stopped forwarding user plane data, the first BS 110 may also release the resources associated with the forwarding of user plane data. The downlink user plane data may then be forwarded from the gateway 350 to the first BS 110 and then directly to the UE 10, as indicated by messages 635 and 636. At step 637, also the second BS 120 stops forwarding of user plane data. This may be accomplished upon expiry of the forwarding timer of duration $T_f$. Having stopped forwarding user plane data, the second BS 120 may also release the resources associated with the forwarding of user plane data.

As can be seen, in the scenario of FIG. 6, forwarding of user plane data from the first BS 110 to the second BS 120 and then back to the first BS 110 may occur. In view of efficient resource usage and delay, it is desirable to avoid such forwarding loops, in particular when considering that such forwarding loops may be more complex than in the ping-pong scenario of FIG. 6, for example a handover sequence may include a first handover from a first BS to a second BS, a second handover from the second BS to a third BS, a third handover from the third BS to a fourth BS, and a fourth handover from the fourth BS back to the second BS.

For avoiding forwarding loops, a BS to which the UE 10 is presently connected may store an identifier of the UE 10 when there is no forwarding of user plane data of the UE 10 from this BS. Such identifier may be stored in a UE context and forwarded during handover to another BS. The identifier could for example be based on or an Internet Protocol address of the gateway 350 and a Tunnel Endpoint Identifier (TEID) for uplink user plane data traffic. Further, the identifier could be based on a cell identifier of the present cell concatenated by a UE identifier within this cell, e.g., by a Cell Radio Network Temporary Identity (C-RNTI). The identifier could be stored as long as forwarding of user plane data takes place. By using the identifier, the BS may detect that the UE 10 returns to the BS while packet forwarding takes place, since the UE has the same identifier in the UE context as another context related to packet forwarding. If such a situation is detected by the BS, it can stop forwarding of the user plane data.

For avoiding forwarding loops, it is also possible that the control node 320 detects that the UE 10 returns to an earlier BS of a sequence of handovers. This could be based on the identity of the first BS of a sequence of handovers. For example such identity could be stored in a UE context of the control node 320. The control node 320 may also store the identities of all BSs of the sequence of handovers since forwarding has started, and detect when the UE 10 returns to one of the earlier BSs. When returning to an earlier BS of the sequence of handovers is detected, the control node can indicate this to the BS, e.g., by a flag in the path switch request acknowledgement message. Based on this indication, the BS can stop forwarding of the user plane data, thereby removing the forwarding loop.

In the above concepts, a number of criteria may be used to control the delay of the handover notification from the control node 320 to the gateway 350 and the extended forwarding of user plane data.

The basic criterion is the delay time period T from the notification of the last handover to the control node. By delaying the notification of the gateway 350 until this delay time period T expires, a sequence of multiple handovers may cause only a single notification to the gateway 350. As a further criterion, a maximum number $P_{max}$ of handovers notified to the control node 320 may be defined, e.g., by implementing a corresponding counter. If the number of handovers notified to the control node 320 reaches this maximum number, the gateway 350 may be notified even if the delay time period T has not yet expired. In this way, the number of hops for forwarding user plane data can be limited.

As a further criterion, a timeout $T_t$ for the total time since the notification of the first handover of a sequence to the control node 320 may be used, e.g., by implementing a further timer. Upon reaching the timeout $T_t$, the gateway 350 may be notified even if the delay time period T has not yet expired. Here, the first handover of the sequence may be defined as the first handover after last notifying the gateway 350 of a handover. In this way, the notification of the gateway 350 is not delayed more than $T_t$ even if there are multiple handovers within the delay time period T.

If the delay time period T is used in connection with the maximum number of notified handovers $P_{max}$, the forwarding time period $T_f$ can be set to be at least $T_f = T \times P_{max}$. If the delay time period T is used in connection with the timeout $T_t$, the forwarding time period $T_f$ can be set to be at least $T_f = T_t$. The values for T, $P_{max}$, and $T_t$ may differ between different BSs of the mobile network. These values may be statically configured in the control node 320, e.g., per BS or per group of BSs, per Tracking Area, on the basis of geographical location, or the like. Further, these values could be dynamically obtained either through provisioning over an external interface or through a self learning system in the control node 320, thereby allowing for an effective balancing between on the one hand handover related signalling load and on the other hand forwarding related load on the inter-BS interfaces.

In some scenarios, it is also useful to restart the timer or timers and/or the counter of notified handovers when the UE 10 to an earlier BS of a sequence of handovers, i.e., when a forwarding loop is detected. In this way the signalling reduction in the case of ping-pong or loop behaviour can be further improved.

As mentioned above, the delay of the handover notification may also be implemented at the target BS. Corresponding scenarios will be further explained in the following.

Similar to the above scenarios, implementing the delay at the target BS may utilize forwarding of user plane data between the source BS and the target BS until the gateway 350 is finally notified. However, in this case notification of the handover from the target BS to the control node is delayed by notifying the control node after expiry of the delay time period T. For this purpose a corresponding timer in the target BS is used. In this way the handover related signalling load between the RAN 100 and the control node 320 and between the control node 320 and the gateway 350 can be reduced.

When implementing the delay at the target BS, a situation may occur in which control plane data need to be transmitted between the target BS and the control node 320 after execution of the handover, but before notification of the handover to the control node. Such a situation may be addressed by forwarding the control plane data between the source BS and the target BS. In the scenarios as illustrated in FIGS. 1, 3, and 4, this forwarding of control plane data may be implemented by routing a part of the S1-MME connection between the target BS and the control node 320 over the X2 inter-BS interface. Alternatively, the need for transmission of control plane data may also trigger the notification of the handover to the control node 320 so that the control plane data can be transmitted directly between the target BS and the control node 320, using an interface provided between the target BS and the control node, such as the S1-MME interface illustrated in FIGS. 1, 3, and 4.

Figure 7:
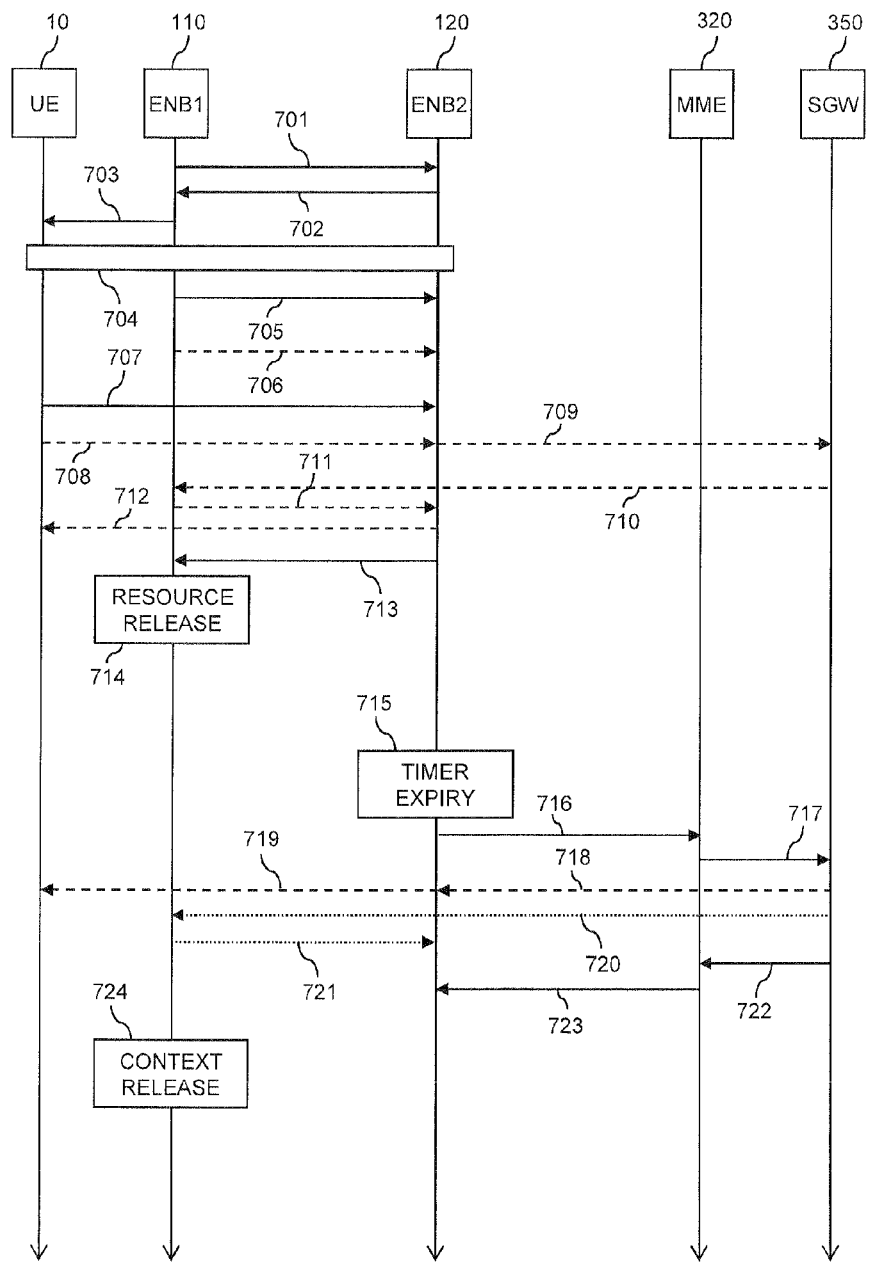
FIG. 7 shows a timing diagram for illustrating further exemplary procedures involving handover signalling according to an embodiment of the invention.

FIG. 7 shows a timing diagram for illustrating procedures in a handover scenario as illustrated in FIG. 1. The procedures involve the UE 10, the source BS 110, the target BS 120, the control node 320, and the gateway 350. In the scenario of FIG. 2, notifying the gateway 350 of a handover of the UE 10 from the source BS 110 to the target BS 120 is delayed at the target BS 120, and forwarding of user plane data between the source BS 110 and the target BS 120 takes place until the gateway 350 is notified of the handover and switches to the second data path P2 established using the interface between the target BS 120 and the gateway 350. Further, also forwarding of control plane data between the source BS 110 and the target BS 120 is possible before the control node 320 is notified of the handover.

In the procedures of FIG. 7, the handover from the source BS 110 to the target BS 120 is prepared by messages 701 and 702. Message 701 may be a handover request from the source BS 110 to the target BS 120, and message 702 may be a handover request acknowledgement form the target BS 120 to the source BS 110, in accordance with 3GPP TS 36.300.

By sending message 703 to the UE 10, the source BS 110 then initiates execution of the handover. In accordance with 3GPP TS 36.300, message 703 may be a RRC connection reconfiguration message and convey mobility control information to the UE 10. As illustrated by step 704, the UE 10 may then detach from the cell of the source BS 110 and synchronize to the cell of the target BS 120. The source BS 110 may then send status information to the target BS 120, using message 705.

As illustrated by message 705, the source BS 110 may then start forwarding downlink user plane data to the target BS 120.

By sending message 707 to the target BS 120, the UE 10 then sets up a connection to the target BS 120. After this, uplink user plane data can be conveyed directly via the target BS 120 to the gateway 350, as illustrated by messages 708 and 709, while downlink user plane data can be conveyed from the gateway 350 to the source BS 110 and then forwarded via the target BS 120 to the UE 10, as illustrated by messages 710 to 712.

In the procedures of FIG. 7, execution of the handover is completed by the target BS 120 sending message 713 to the source BS 110, to initiate releasing of UE resources at the source BS 110. Message 713 may be UE context release message in accordance with 3GPP TS 23.401 and 36.300. Further, the target BS 120 starts a timer having a duration which corresponds to the delay time period T for delaying notification of the handover to the control node 320. The duration of the timer, i.e., the delay time period T, may be configurable, e.g., through OAM procedures.

Upon receiving message 713, the source BS 110 releases resources related to the UE 10, as indicated by step 714. However, the source BS 110 keeps sufficient state information to continue forwarding downlink user plane data of the UE 10. In accordance with the illustrated concepts, the source BS 110 is configured to continue with packet forwarding for a forwarding time period $T_f$ which is longer than the delay time period T for delaying the control signalling to the control node 320. For this purpose, a forwarding timer of duration $T_f$ may be started together with the forwarding of user plane data by the source BS 110, i.e., upon sending message 706. The forwarding time period $T_f$ may be configurable, e.g., through OAM procedures. Alternatively or additionally, the use of the longer forwarding time period $T_f$ may be negotiated by the target BS 120 and the BS 110 during the setup of the inter-BS connection therebetween. It may also be possible for the target BS 120 to store information indicating which BS supports a sufficiently long forwarding time period $T_f$ and to apply the delaying of the handover notification to the control node 320 only if the source BS 110 supports such a sufficiently long forwarding time period $T_f$. The target BS 120 may learn such information from the other BSs and/or may be configured with such information in advance, e.g., on a per TAI basis, or on a per network domain network domain basis. Further, the source BS 110 maintains context information allowing for continued signalling with the target BS 120 over the inter-BS interface, in particular for forwarding control plane data between the source BS 110 and the target BS 120.

At step 715, the timer expires. In the scenario of FIG. 7, it is assumed that the timer expires before another handover of the UE 10. After expiry of the timer, the target BS 120 requests path switching to the second data path P2 established using the interface between the target BS 120 and the gateway 350. This is accomplished by sending message 716 to the control node 320. The message 716 may be a path switch request in accordance with 3GPP TS 23.401 and 36.300.

In response to the path switch request of message 716, the control node 320 notifies the gateway 350 of the handover. This is accomplished by sending message 717 to the gateway 350. Message 717 may be a Modify Bearer Request message in accordance with 3GPP TS 23.401. Upon receiving the message 717, the gateway 350 switches conveying of user plane data to the second data path P2 of FIG. 1. Accordingly, as illustrated by messages 718 and 719, downlink user plane data are no longer conveyed via the source BS 110.

For facilitating packet reordering, the gateway 350 may then send an end marker via the source BS 110 to the target BS 120, as illustrated by messages 720 and 721. The sending of the end marker may be accomplished in accordance with 3GPP TS 23.401 and 36.300.

By sending message 722 to the control node 320, the gateway 350 then responds to the notification of message 717. Message 722 may be a Modify Bearer Response accordance with 3GPP TS 23.401.

By message 723, the control node 320 acknowledges the path switch request of message 716.

At step 724, the source BS 110 may release all resources associated with the UE 10, including the resources for forwarding of user plane data and the context for signalling with the target BS 120. This may be accomplished in response to signalling from the target BS 120 or upon expiry of a timer, e.g., the forwarding timer of duration $T_f$.

Also when delaying the signalling of a handover at the target BS, there can be a sequence of multiple handovers within the delay time period. The forwarding of user plane data and/or of control plane data between the BSs involved in the sequence of handovers can then be accomplished by chaining as explained in connection with FIG. 3, i.e., by forwarding the user plane data and/or control plane data between adjacent BSs of the handover sequence, or by anchoring as explained in connection with FIG. 4, e.g., by forwarding the user plane data and/or control plane data directly between the source BS of the first handover of the sequence and the target BS of the last handover of the sequence, using a corresponding inter-BS interface therebetween. Also in this case, the anchoring option may provide a more efficient usage of inter-BS interface resources.

Figure 8:
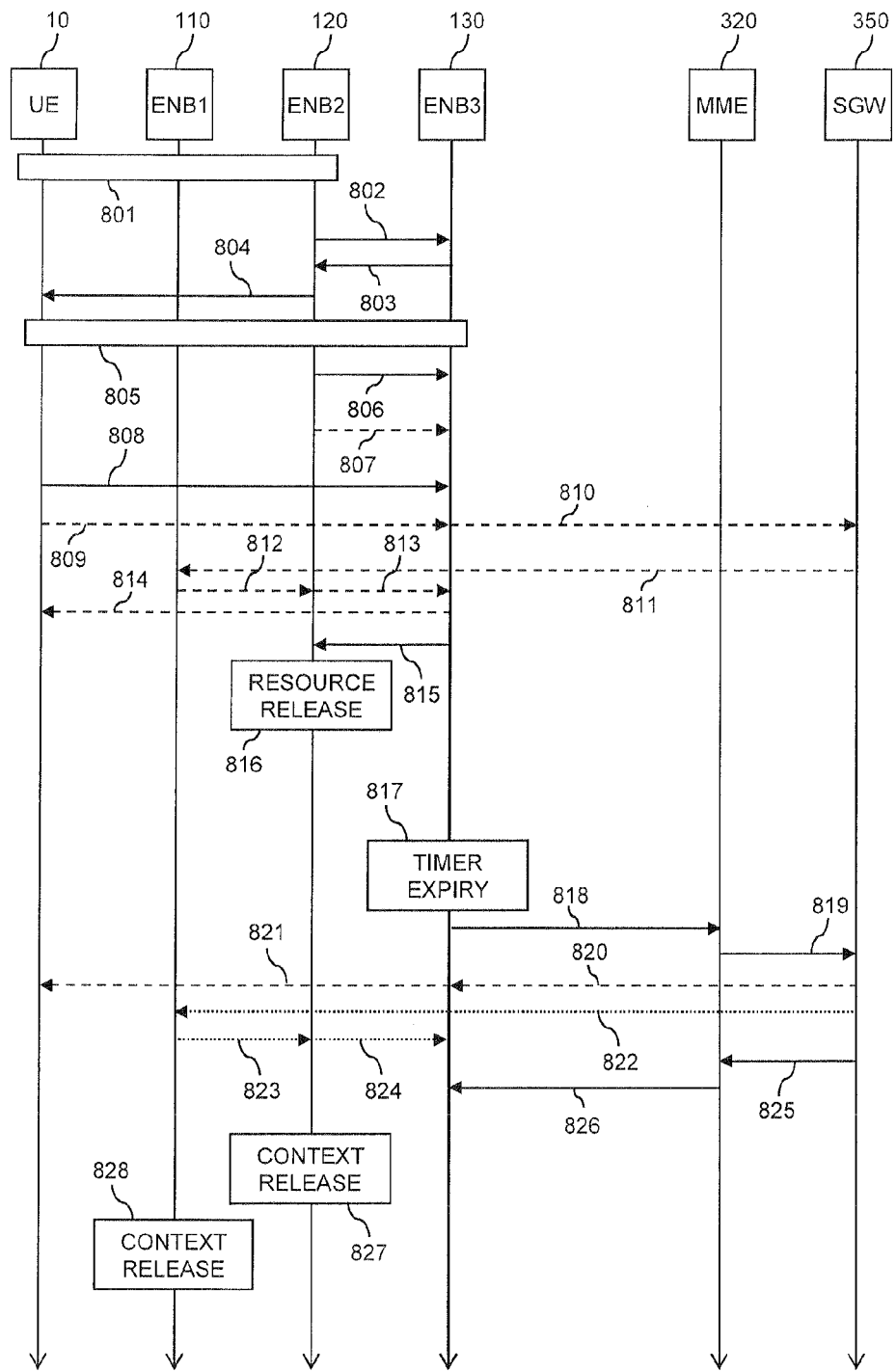
FIG. 8 shows a timing diagram for illustrating further exemplary procedures involving handover signalling according to an embodiment of the invention.

FIG. 8 shows a timing diagram for illustrating procedures in a handover scenario as illustrated in FIG. 3. The procedures involve the UE 10, the first BS 110, the second BS 120, the third BS 130, the control node 320, and the gateway 350. A sequence of a first handover from the first BS 110 to the second BS 120 and a second handover from the second BS 120 to the third BS 130 is assumed. In the scenario of FIG. 8, notifying the control node 320 of the first handover and the second handover is delayed at the respective target BSs, i.e., notification of the first handover to the control node 320 is delayed at the second BS 120, and it eventually does not take place as the second handover comes earlier. Notification of the second handover to the control node 320 is delayed at the third BS 130. Forwarding of downlink user plane data from the first BS 110 to the third BS 130 is accomplished via the second BS 120 and takes place until the gateway 350 is notified of the second handover and switches to the third data path P3 established using the interface between the third BS 130 and the gateway 350. Further, also forwarding of control plane data between the first BS 110, the second BS 120, and the third BS 130 is possible before the control node 320 is notified of the second handover.

At step 801, the first handover from the first BS 110 to the second BS 120 is prepared and executed. This may be accomplished as explained in connection with messages and steps 701 to 714 of FIG. 7. However, as compared to FIG. 7 it is now assumed that the second handover from the second BS 120 to the third BS 130 is executed before expiry of the timer started when completing execution of the first handover.

In the procedures of FIG. 8, the handover from the second BS 120 to the third BS 130 is prepared by messages 802 and 803. Message 802 may be a handover request from the second BS 120 to the third BS 130, and message 803 may be a handover request acknowledgement form the third BS 130 to the second BS 120, in accordance with 3GPP TS 36.300.

By sending message 804 to the UE 10, the second BS 120 then initiates execution of the second handover. In accordance with 3GPP TS 36.300, message 804 may be a RRC connection reconfiguration message and convey mobility control information to the UE 10. As illustrated by step 805, the UE 10 may then detach from the cell of the second BS 120 and synchronize to the cell of the third BS 130. The second BS 120 may then send status information to the third BS 130, using message 806.

As illustrated by message 807, the second BS 120 may then start forwarding downlink user plane data to the third BS 130. Here, it is to be understood that it is the first BS 110 which in turn forwards such downlink user plane data to the second BS 120.

By sending message 808 to the third BS 130, the UE 10 then sets up a connection to the third BS 130. After this, uplink user plane data can be conveyed directly via the third BS 130 to the gateway 350, as illustrated by messages 809 and 810, while downlink user plane data can be conveyed from the gateway 350 to the first BS 110 and then forwarded via the second BS 120 and the third BS 130 to the UE 10, as illustrated by messages 811 to 814.

In the procedures of FIG. 8, execution of the second handover is completed by the third BS 130 sending message 815 to the second BS 120, to initiate releasing of UE resources at the second BS 120. Message 815 may be UE context release message in accordance with 3GPP TS 23.401 and 36.300. Further, the third BS 130 starts a timer having a duration which corresponds to the delay time period T for delaying notification of the handover to the control node 320. The duration of the timer, i.e., the delay time period T, may be configurable, e.g., through OAM procedures.

Upon receiving message 815, the second BS 120 releases resources related to the UE 10, as indicated by step 816. However, the second BS 120 keeps sufficient state information to continue forwarding downlink user plane data of the UE 10. In accordance with the illustrated concepts, the second BS 120 is configured to continue with packet forwarding for a forwarding time period $T_f$ which is longer than the delay time period T for delaying the control signalling to the control node 320. For this purpose, a forwarding timer of duration $T_f$ may be started together with the forwarding of user plane data by the second BS 120, i.e., upon sending message 806. The forwarding time period $T_f$ may be configured in a similar manner as explained in connection with step 714 of FIG. 7. Further, the second BS 120 maintains context information allowing for continued signalling with the third BS 130 over the inter-BS interface, in particular for forwarding control plane data between the second BS 120 and the third BS 130.

At step 817, the timer expires. In the scenario of FIG. 8, it is assumed that the timer expires before another handover of the UE 10. After expiry of the timer, the third BS 130 requests path switching to the third data path P3 established using the interface between the third BS 130 and the gateway 350. This is accomplished by sending message 818 to the control node 320. The message 818 may be a path switch request in accordance with 3GPP TS 23.401 and 36.300.

In response to the path switch request of message 818, the control node 320 notifies the gateway 350 of the second handover. This is accomplished by sending message 819 to the gateway 350. Message 819 may be a Modify Bearer Request message in accordance with 3GPP TS 23.401. Upon receiving the message 819, the gateway 350 switches conveying of user plane data to the third data path P3 of FIG. 3. Accordingly, as illustrated by messages 820 and 821, downlink user plane data are no longer conveyed via the first BS 110 and the second BS 120.

For facilitating packet reordering, the gateway 350 may then send an end marker via the first BS 110 and the second BS 120 to the third BS 130, as illustrated by messages 822 to 824. The sending of the end marker may be accomplished in accordance with 3GPP TS 23.401 and 36.300.

By sending message 825 to the control node 320, the gateway 350 then responds to the notification of message 819. Message 825 may be a Modify Bearer Response accordance with 3GPP TS 23.401.

By message 826, the control node 320 acknowledges the path switch request of message 818.

At step 827, the second BS 120 may release all resources associated with the UE 10, including the resources for forwarding of user plane data and the context for signalling with the third BS 130. This may be accomplished in response to signalling from the third BS 130 or upon expiry of a timer, e.g., the forwarding timer of duration $T_f$. Similarly, at step 828, the first BS 110 may release all resources associated with the UE 10, including the resources for forwarding of user plane data and the context for signalling with the third BS 120. This may be accomplished in response to signalling from the second BS 120 or upon expiry of the forwarding timer of duration $T_f$.

In the example of FIG. 8, the handover related signalling between the RAN 100 and the control node 320, and also between the control node 320 and the gateway 350 is significantly reduced, because the first handover is not notified to the control node 320, and consequently not to the gateway 350. Instead, only the second handover, which followed the first handover within the delay time period T, is notified.

As mentioned above, when delaying the notification of the handover from the target BS to the control node 320, control plane data exchanged by the target BS and the control node 320 may be via other BSs in the handover sequence. The forwarded control plane data may for example include Non Access Stratum (NAS) messages of the S1-MME interface or other messages of the S1-MME interface without NAS content. The notification itself, in the examples of FIG. 7 and the path switch request of messages 716 and 818, may however be sent directly from the target BS to the control node 320.

Forwarding the control plane data between two BSs may be accomplished using an existing control plane association between the BSs, e.g., on the basis of the X2 inter-base station interface. For this purpose, a new type of control message may be defined or an existing control message may be modified. In some scenarios, an identifier for the X2 control plane between to BSs can also be used to identify the UE 10. When forwarding, a BS may replace an S1/X2 identifier with a UE identifier at the target BS or with an X2/S1 identifier of the control node 320. In this way, it is possible to re-use the UE identifiers of established X2 connections and it is not necessary to forward an S1/X2 specific identifiers on another interface. Further, a special container message format for the X2 interface may be defined for the purpose of control message forwarding. The forwarding of the control plane data may be applied to both uplink control plane data transmitted from the target BS to the control node 320 and to downlink control plane data transmitted from the control node 320 to the target BS. In some scenarios, control plane data to be forwarded may be temporarily buffered by a BS, e.g., if the UE 10 has already moved to a new BS, but there has not yet been any signalling from the new BSs.

Figure 9:
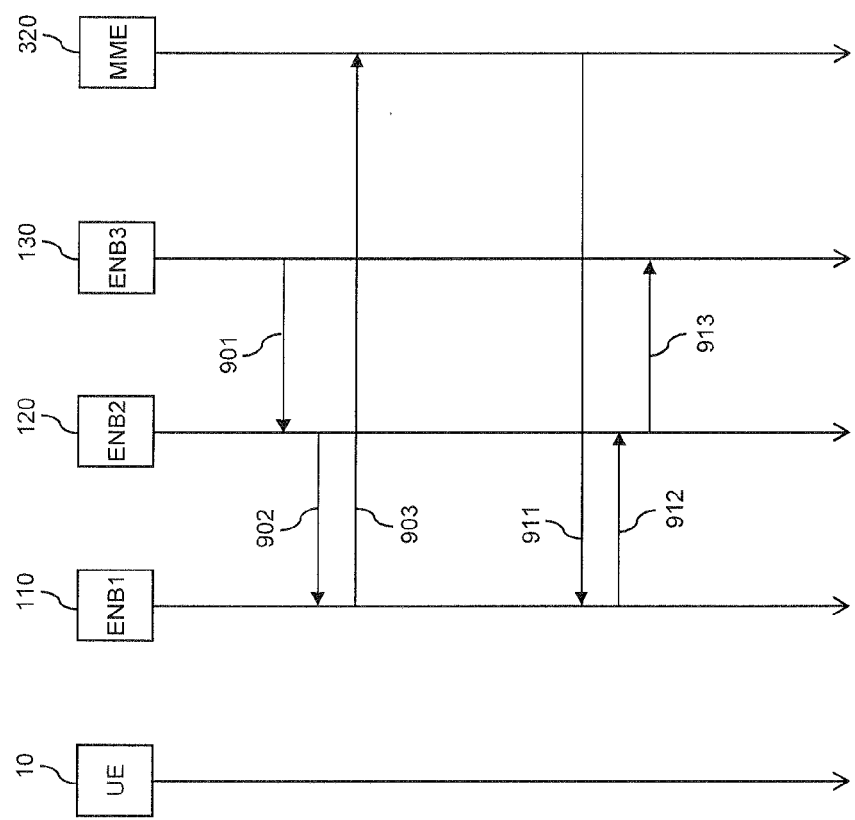
FIG. 9 shows a timing diagram for illustrating exemplary procedures for forwarding of control signalling according to an embodiment of the invention.

A timing diagram for illustrating corresponding forwarding procedures is illustrated in FIG. 9. The procedures of FIG. 9 involve the first BS 110, the second BS 120, the third BS 130, and the control node 320, e.g., as in the scenarios of FIGS. 3 and 8.

In the timing diagram of FIG. 9, it is first assumed that the third BS 130 needs to send uplink control plane data to the control node 320. The control plane data may for example include a control message of the S1-MME interface.

By message 901, the third BS 130 forwards the control plane data to the second BS 120. The message 901 is be transmitted over the inter-BS interface between the third BS 130 and the second BS 120. By message 902, the second BS 120 then forwards the control plane data to the first BS 110. The message 902 is transmitted over the inter-BS interface between the second BS 120 and the first BS 110.

By message 903, the first BS 110 forwards the control plane data to the control node, using the direct control plane interface between the first BS 110 and the control node 320.

Next it is assumed that the control node 320 needs to send downlink control plane data. Again, the control plane data may for example include a control message of the S1-MME interface. However, due to the delayed notification of handovers, the control node 320 may be not aware that the UE 10 executed handovers to the second BS 120 and then to the third BS 130. Accordingly, by message 911 the control node 320 sends the control plane data to the first BS 110.

The first BS 110, which is aware of the handover to the second BS 120, then forwards the control plane data to the second BS 120, using message 912. The message 912 is transmitted over the inter-BS interface between the first BS 110 and the second BS 120. The second BS 120, which in turn is aware of the handover to the third BS 130, then forwards the control plane data to the third BS 130, using message 913. The message 913 is transmitted over the inter-BS interface between the second BS 120 and the third BS 130.

As further mentioned above, it is also possible that the need to send control plane data triggers notification of the handover to the control node 320, irrespective of the expiry of the delay time period. An example of corresponding procedures for uplink control plane data is illustrated in FIG. 10, and an example of corresponding procedures for downlink control plane data is illustrated in FIG. 11.

Figure 10:
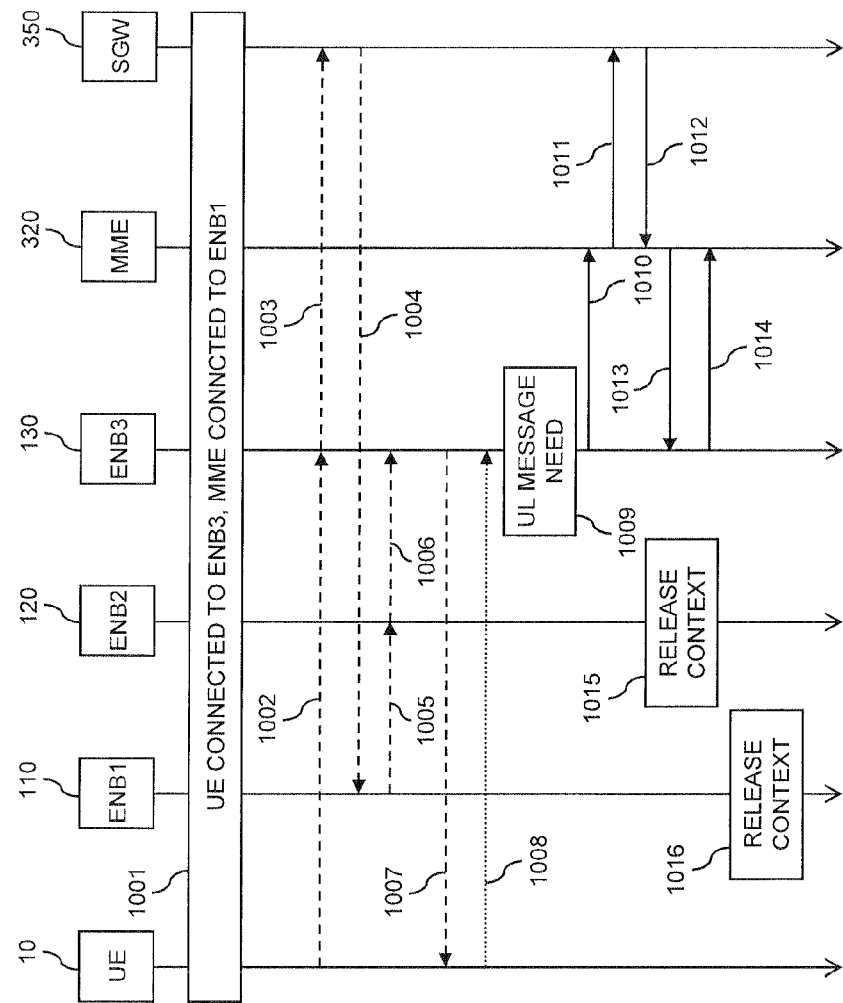
FIG. 10 shows a timing diagram for illustrating exemplary procedures according to an embodiment of the invention, in which path switching is triggered by a need for uplink control signalling.
Figure 11:
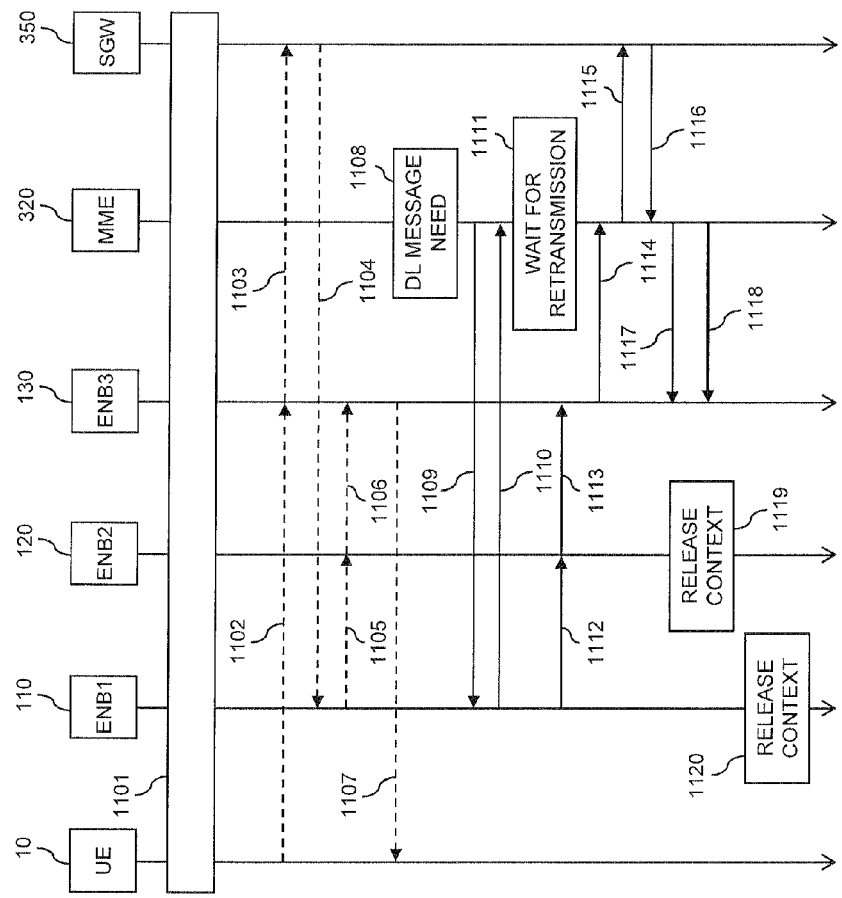
FIG. 11 shows a timing diagram for illustrating exemplary procedures according to an embodiment of the invention, in which path switching is triggered by a need for downlink control signalling.

In the procedures of FIG. 10, it is assumed that the third BS 130 needs to send uplink control plane data to the control node 320. The control plane data may for example include a control message of the S1-MME interface. However, due to the delaying of the notification of the handover to the control node 320, the control node 320 is not aware of the handover of the UE 10 to the third BS 130. Accordingly, the third BS 130 may buffer the control plane data, notify the control node 320 of the handover by sending the path switch request, and then send the control plane data directly to the control node 320.

The procedures of FIG. 10 involve the UE 10, the first BS 110, the second BS 120, the third BS 130, the control node 320, and the gateway 350. In the initial situation underlying the procedures of FIG. 10, it is assumed that the UE 10 performed a first handover from the first BS 110 to the second BS 120 and then a second handover from the second BS 120 to the third BS 130, so that the UE 10 is connected to the third BS 130, but the core network, in particular the control node 320, is still connected to the first BS 110, as illustrated by step 1001. In this situation, uplink user plane data can be conveyed directly via the third BS 130 to the gateway 350, as illustrated by messages 1002 and 1003, while downlink user plane data can be conveyed from the gateway 350 to the first BS 110 and then forwarded via the second BS 120 and the third BS 130 to the UE 10, as illustrated by messages 1004 to 1007.

In this situation, the third BS 130 may have a need to send uplink control plane data to the control node 320, e.g., a control message of the S1-MME interface. For example, such need may be caused by the UE 10 sending message 1008 to the third BS 130. The message 1008 may be a NAS message.

At step 1009, the need to send the uplink control data arises at the third BS 130. In response to detecting this need, the third BS 130 notifies the control node 320 of the handover to the third BS 130, to update the user and control plane data paths. This is accomplished by sending message 1010 to the control node 320. Message 1010 may be a path switch request in accordance with 3GPP TS 23.401 and 36.300. In response to message 1010, the control node 320 notifies the gateway 350 of the handover. This is accomplished by sending message 1011 to the gateway 350. Message 1011 may be a Modify Bearer Request message in accordance with 3GPP TS 23.401. Upon receiving the message 1011, the gateway 350 switches conveying of user plane data to the data path P3 established via the interface between the third BS 130 and the gateway 350. By sending message 1012 to the control node 320, the gateway 350 then responds to the notification of message 1011. Message 1012 may be a Modify Bearer Response accordance with 3GPP TS 23.401. By sending message 1013 to the third BS 130, the control node 320 acknowledges the path switch request of message 1010.

Message 1012 confirms to the third BS 130 that the control node 320 now is aware of the UE 10 being connected to the third BS 130. Accordingly, the third BS 130 may then proceed by sending the control plane data directly to the control node 320, using message 1014 which is transmitted via the interface provided between the third BS 130 and the control node 320.

At step 1015, the second BS 120 may release all resources associated with the UE 10, including the resources for forwarding of user plane data and the context for signalling with the third BS 130. Similarly, at step 1016, the first BS 110 may release all resources associated with the UE 10, including the resources for forwarding of user plane data and the context for signalling with the third BS 120.

In the procedures of FIG. 11, it is assumed that the control node 320 needs to send downlink control plane data to the BS to which the UE 10 is connected. The control plane data may for example include a control message of the S1-MME interface.

The procedures of FIG. 11 involve the UE 10, the first BS 110, the second BS 120, the third BS 130, the control node 320, and the gateway 350. In the initial situation underlying the procedures of FIG. 11, it is assumed that the UE 10 performed a first handover from the first BS 110 to the second BS 120 and then a second handover from the second BS 120 to the third BS 130, so that the UE 10 is connected to the third BS 130, but the core network, in particular the control node 320, is still connected to the first BS 110, as illustrated by step 1001. In this situation, uplink user plane data can be conveyed directly via the third BS 130 to the gateway 350, as illustrated by messages 1102 and 1103, while downlink user plane data can be conveyed from the gateway 350 to the first BS 110 and then forwarded via the second BS 120 and the third BS 130 to the UE 10, as illustrated by messages 1104 to 1107.

In this situation, if the need for sending downlink control plane data arises as illustrated at step 1108. The delaying of the notification of the handover to the control node 320 causes the control node 320 to be not aware of the handover of the UE 10 to the third BS 130. Rather, the control node 320 assumes that the UE 10 is still connected to the first BS 110. Accordingly, the control node 320 attempts to send the control plane data by message 1109 to the first BS 110. However, because the UE 10 is no longer connected to the first BS 110, the first BS 1110 indicates a failure by sending message 1110 to the control node 320. Message 1110 may for example include a failure cause, i.e., that a handover was performed, such as defined in 3GPP TS 23.401.

In response to receiving the message 1110, the control node 320 may arrange for a retransmission of the control plane data after a certain retransmission delay period. For this purpose, a corresponding timer may be started. The retransmission delay period may be configurable, e.g., through OAM procedures. If the need to transmit the control plane data was originally triggered by a control message from the gateway 350, the control node 320 may also provide a failure indication to the gateway 350, e.g., by returning an error cause such as "Temporarily rejected due to handover procedure in progress" as defined in 3GPP TS 29.274. This may in turn cause retransmission of the control message by the gateway 350.

In response to receiving message 1109, the first BS 110 also sends message 1112 to the BS to which the UE 10 was handed over from the first BS 110. In the present case, this would be the second BS 120. Message 1112 includes a command for controlling the BS to which the UE 10 is connected to initiate path switching by notifying the control node 320 of the last handover of the UE 10. The command is forwarded by the BSs until the target BS of the last handover in the sequence is reached. Accordingly, in the illustrated example the second BS 120 sends message 1113 to the third BS 130 and thereby forwards the command to the third BS 130 to which the UE 10 is connected.

In response to receiving message 1113, the third BS 130 executes the command by notifying the control node 320 of the handover, to update the user and control plane data paths. This is accomplished by sending message 1114 to the control node 320. Message 1114 may be a path switch request in accordance with 3GPP TS 23.401 and 36.300.

In response to message 1114, the control node 320 notifies the gateway 350 of the handover. This is accomplished by sending message 1115 to the gateway 350. Message 1115 may be a Modify Bearer Request message in accordance with 3GPP TS 23.401. Upon receiving the message 1115, the gateway 350 switches conveying of user plane data to the data path P3 established via the interface between the third BS 130 and the gateway 350. By sending message 1116 to the control node 320, the gateway 350 then responds to the notification of message 1115. Message 1116 may be a Modify Bearer Response accordance with 3GPP TS 23.401. By sending message 1117 to the third BS 130, the control node 320 acknowledges the path switch request of message 1114.

The control node 320, which is now aware of the UE 10 being connected to the third BS 130, may then proceed by retransmitting the control plane data directly to the third BS 130, using message 1118 which is transmitted via the interface provided between the third BS 130 and the control node 320. This may be accomplished after expiry of the above-mentioned retransmission delay period, e.g., as indicated by the expiry of the corresponding timer.

At step 1119, the second BS 120 may release all resources associated with the UE 10, including the resources for forwarding of user plane data and the context for signalling with the third BS 130. Similarly, at step 1120, the first BS 110 may release all resources associated with the UE 10, including the resources for forwarding of user plane data and the context for signalling with the third BS 120.

Figure 12:
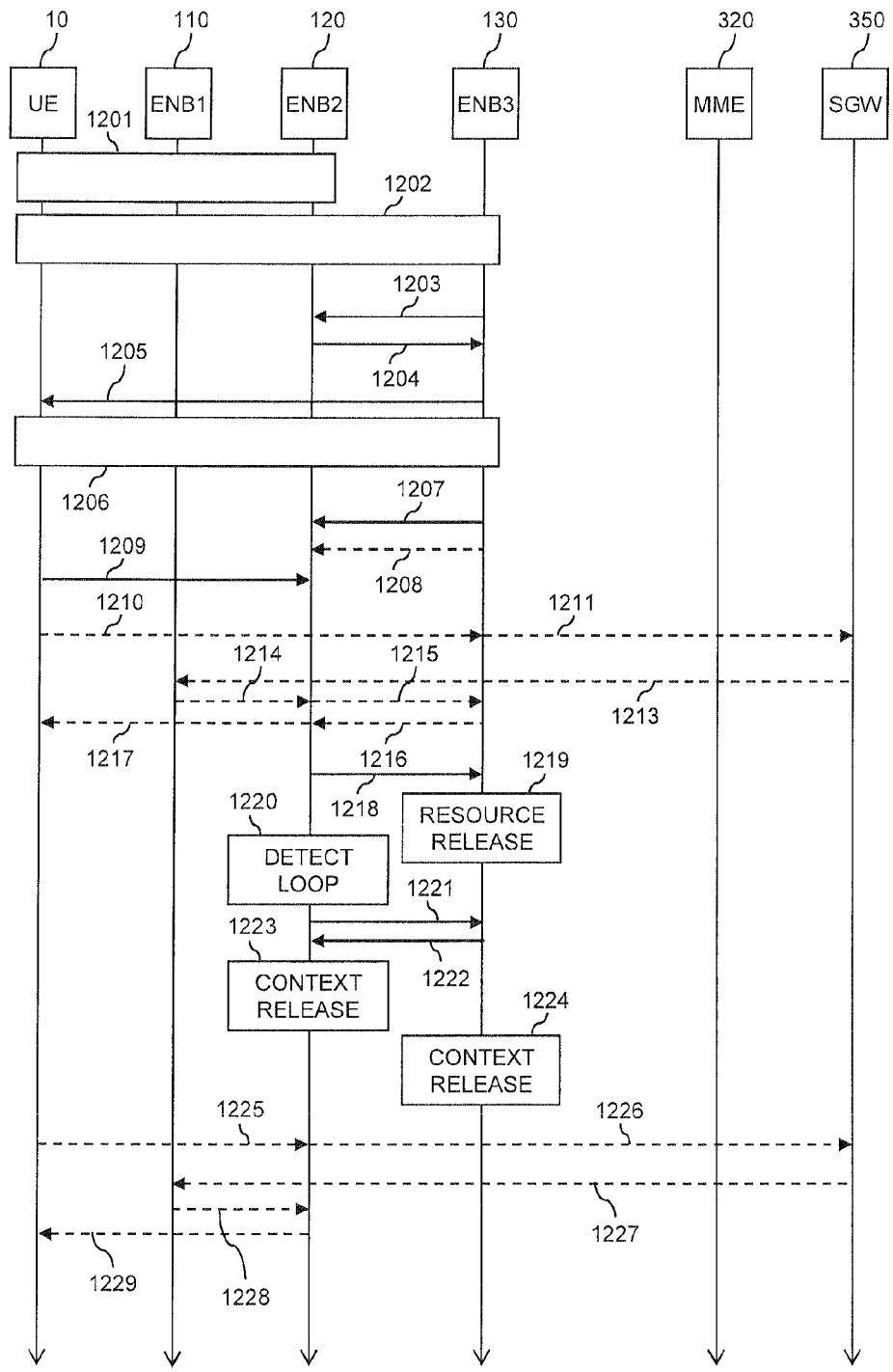
FIG. 12 shows a timing diagram for illustrating exemplary procedures for avoiding forwarding loops according to an embodiment of the invention.

FIG. 12 shows a timing diagram for illustrating procedures for avoiding forwarding loops in handover sequences while using delaying of the handover notification at the target BS. The procedures involve the UE 10, the first BS 110, the second BS 120, the third BS, the control node 320, and the gateway 350, as illustrated in FIG. 3. As compared to FIG. 3, an extended sequence of handovers is assumed: a first handover of the UE 10 from the first BS 110 to the second BS 120, a second handover of the UE 10 from the second BS 120 to the third BS 130, and a third handover of the UE 10 from the third BS 130 back to the second BS 120. With respect to the first handover, the first BS 110 is the source BS and the second BS 120 is the target BS. With respect to the second handover, the second BS 120 is the source BS and the third BS 130 is the target BS. With respect to the third handover, the third BS 130 is the source BS and the second BS 120 is the target BS. In the scenario of FIG. 12, notifying the gateway 350 of the handovers is delayed at the BSs 110, 120, 130 while forwarding of user plane data is accomplished between the first BS 110, the second BS 120, and the third BS 130. Further, also forwarding of control plane data between the first BS 110, the second BS 120, and the third BS 130 is possible.

At step 1201, the first handover from the first BS 110 to the second BS 120 is prepared and executed. This may be accomplished as explained in connection with messages and steps 701 to 714 of FIG. 7. However, in this case it is further assumed that the request for the first handover from the first BS 110 to the second BS 120 includes an anchor identifier. The anchor identifier uniquely identifies the UE 10 and the first source BS of the sequence of handovers, and is forwarded to the next BS of the handover sequence in the respective handover request. The anchor identifier can be the concatenation of an IP address of the first source BS of the sequence and an identifier of the UE as used in messages of the inter-BS interface. Other identifiers could be used as well, such as an uplink IP address of the gateway 350 and the TEID. As compared to FIGS. 7 and 8 it is further assumed that the second handover, which is prepared and executed at step 1202, is executed before expiry of the timer started when completing execution of the first handover and also that the third handover is executed before expiry of the timer started when completing execution of the second handover. Accordingly, the second BS 120 may skip notification of the first handover to the control node 320, and the third BS 130 may skip notification of the second handover to the control node 320.

In the procedures of FIG. 12, the third handover from the third BS 130 back to the second BS 120 is prepared by messages 1203 and 1204. Message 1203 may be a handover request from the first BS 130 to the second BS 120, and message 1204 may be a handover request acknowledgement form the second BS 120 to the third BS 130, in accordance with 3GPP TS 36.300. Message 1204 includes the anchor identifier which was forwarded from the second BS 120 to the third BS 130 in the request for the second handover.

By sending message 1205 to the UE 10, the third BS 130 then initiates execution of the third handover. In accordance with 3GPP TS 36.300, message 1205 may be a RRC connection reconfiguration message and convey mobility control information to the UE 10. As illustrated by step 1206, the UE 10 may then detach from the cell of the third BS 130 and synchronize to the cell of the second BS 120. The third BS 130 may then send status information to the second BS 120, using message 1207.

As illustrated by message 1208, the third BS 130 may then start forwarding downlink user plane data to the second BS 120.

By sending message 1209 to the second BS 120, the UE 10 then sets up a connection to the second BS 120. After this, uplink user plane data can be conveyed directly via the second BS 120 to the gateway 350, as illustrated by messages 1210 and 1211, while downlink user plane data can be conveyed from the gateway 350 to the first BS 110 and then forwarded via the second BS 120, the third BS 130, and then again the second BS 120 to the UE 10, as illustrated by messages 1212 to 1217.

In the procedures of FIG. 12, execution of the third handover is completed by the second BS 120 sending message 1218 to the third BS 130, to initiate releasing of UE resources at the second BS 130. Message 1218 may be UE context release message in accordance with 3GPP TS 23.401 and 36.300. Further, the second BS 120 restarts the timer with having a duration T for delaying notification of the handover to the control node 320.

Upon receiving message 1218, the third BS 130 releases resources related to the UE 10, as indicated by step 1219.

However, the third second BS 130 keeps sufficient state information to continue forwarding downlink user plane data of the UE 10. In accordance with the illustrated concepts, the third second BS 130 is configured to continue with packet forwarding for a forwarding time period $T_f$ which is longer than the delay time period T for delaying the notification of the handover to the control node 320. For this purpose, a forwarding timer of duration $T_f$ may be started together with the forwarding of user plane data by the second BS 120, i.e., upon sending message 1208. The forwarding time period $T_f$ may be configured in a similar manner as explained in connection with step 714 of FIG. 7. Further, the third BS 130 maintains context information allowing for continued signalling with the second BS 120 over the inter-BS interface, in particular for forwarding control plane data between the third BS 130 and the second BS 120.

As can be seen from messages 1215 and 1216, a forwarding loop is formed by the second BS 120 and the third BS 130. The second BS 120 detects this forwarding loop at step 1220. This is accomplished on the basis of the anchor identifier received from the third BS 130 in message 1203. In particular, the second BS 120 may determine that the anchor identifier is the same as another anchor identifier associated with traffic forwarding by the second BS 120, namely the anchor identifier received from the first BS 110 together with the request for the first handover.

For removing the forwarding loop, the second BS 120 sends message 1221 to the previous BS in the sequence of handovers, i.e., to the third BS 130. The message 1221 includes a loop removal command. The loop removal command is forwarded from one BS of a sequence of handovers to the previous one, i.e., to the adjacent source BS, until it has travelled through the loop, i.e., returned to the BS which generated the loop removal command. In the scenario of FIG. 12, this means that the loop removal command is forwarded from the third BS 130 to the second BS 120, but not further. In each BS receiving the loop removal command, forwarding can be stopped and the corresponding resources and context released. In the scenario of FIG. 12, this means that the second BS 120 stops forwarding with respect to the third BS 130 and releases corresponding resources and context, as illustrated at step 1223, and that the third BS 130 stops forwarding with respect to the second BS 120 and releases corresponding resources and context, as illustrated at step 1224. In this way, the forwarding loop is removed. The stopping of forwarding and releasing of the corresponding context and resources can be delayed by a configurable time interval to account for delays in the forwarded user plane and/or control plane data and to allow for reordering of data packets.

Having removed the forwarding loop, downlink user plane data can be conveyed from the gateway 350 to the first BS 110 and then forwarded via the second BS 120 directly to the UE 10 as illustrated by messages 1227 to 1229.

Figure 13:
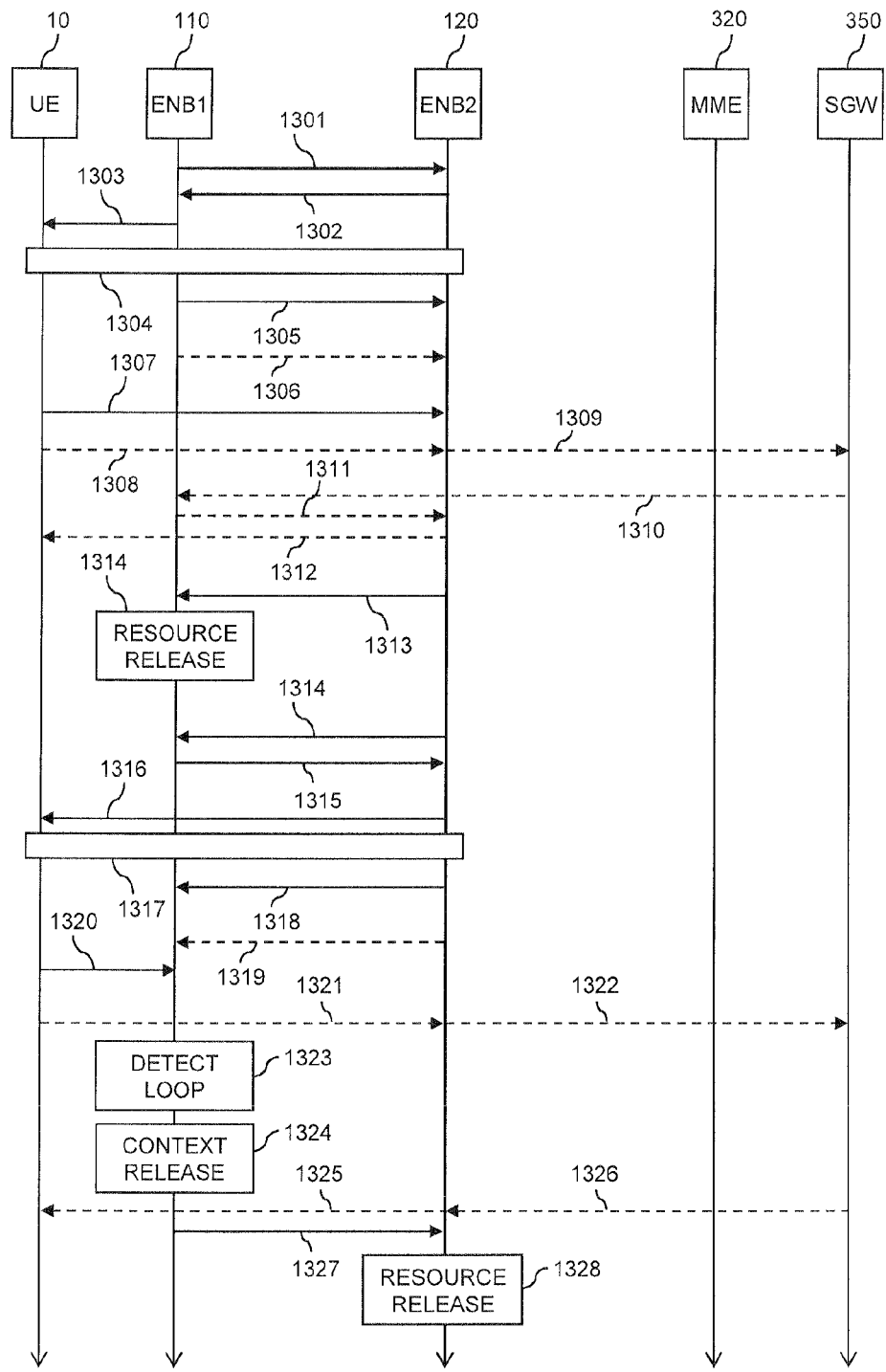
FIG. 13 shows a timing diagram for illustrating further exemplary procedures for avoiding forwarding loops according to an embodiment of the invention.

FIG. 13 shows a timing diagram for illustrating procedures for handling of a ping-pong scenario while delaying notification of the handover at the target BS. In the scenario of FIG. 13, it is assumed that due to certain restrictions, forwarding loops may not exceed two hops. This could be accomplished by imposing a limit of two on the maximum number of handovers in a sequence before notification to the control node 320, e.g., by forwarding an indication of the number of handovers in sequence between the BSs of the sequence. The procedures involve the UE 10, the first BS 110, the second BS 120, the control node 320, and the gateway 350, as illustrated in FIG. 1. In the scenario of FIG.

13, a sequence of handovers is assumed which includes a first handover of the UE 10 from the first BS 110 to the second BS 120, and a second handover of the UE 10 from the second BS 120 back to the first BS 110. With respect to the first handover, the first BS 110 is the source BS and the second BS 120 is the target BS. With respect to the second handover, the second BS 120 is the source BS and the first BS 110 is the target BS. In the scenario of FIG. 13, notification of the first handover is delayed at second BS 120, and notification of the second handover is delayed at the first BS 110 while forwarding of user plane data is accomplished between the first BS 110 and the second BS 120.

In the procedures of FIG. 13, the first handover from the first BS 110 to the second BS 120 is prepared by messages 1301 and 1302. Message 1301 may be a handover request from the first BS 110 to the second BS 120, and message 1302 may be a handover request acknowledgement form the second BS 120 to the first BS 110, in accordance with 3GPP TS 36.300. As in the scenario of FIG. 12, message includes the anchor identifier to be forwarded to the next BS of a sequence of handovers.

By sending message 1303 to the UE 10, the first BS 110 then initiates execution of the handover. In accordance with 3GPP TS 36.300, message 1303 may be a RRC connection reconfiguration message and convey mobility control information to the UE 10. As illustrated by step 1304, the UE 10 may then detach from the cell of the first BS 110 and synchronize to the cell of the second BS 120. The first BS 110 may then send status information to the second BS 120, using message 1305.

As illustrated by message 1306, the first BS 110 may then start forwarding downlink user plane data to the second BS 120.

By sending message 1307 to the second BS 120, the UE 10 then sets up a connection to the second BS 120. After this, uplink user plane data can be conveyed directly via the second BS 120 to the gateway 350, as illustrated by messages 1308 and 1309, while downlink user plane data can be conveyed from the gateway 350 to the first BS 110 and then forwarded via the second BS 120 to the UE 10, as illustrated by messages 1310 to 1312.

In the procedures of FIG. 13, execution of the first handover is completed by the second BS 120 sending message 1313 to the first BS 110, to initiate releasing of UE resources at the first BS 110. Message 1313 may be UE context release message in accordance with 3GPP TS 23.401 and 36.300. Further, the second BS 120 starts the timer of duration T for delaying notification of the handover to the control node 320.

Upon receiving message 1313, the first BS 110 releases resources related to the UE 10, as indicated by step 1314. However, the first BS 110 keeps sufficient state information to continue forwarding downlink user plane data of the UE 10. In accordance with the illustrated concepts, the source BS 110 is configured to continue with packet forwarding for a forwarding time period $T_f$ which is longer than the delay time period T for delaying the notification of the handover to the control node 320. For this purpose, the forwarding timer of duration $T_f$ may be started together with the forwarding of user plane data by the source BS 110, i.e., upon sending message 1306. Further, the first BS 110 maintains context information allowing for continued signalling with the second BS 120 over the inter-BS interface, in particular for forwarding control plane data between the first BS 110 and the second BS 120.

The second handover from the second BS 120 back to the first BS 110 is then prepared by messages 1314 and 1315. Message 1314 may be a handover request from the second BS 120 to the first BS 110, and message 1315 may be a handover request acknowledgement form the first BS 110 to the second BS 120, in accordance with 3GPP TS 36.300. The message 1314 includes the anchoring identifier which was forwarded to the second BS 120 in the handover request of message 1301.

By sending message 1316 to the UE 10, the second BS 120 then initiates execution of the second handover. In accordance with 3GPP TS 36.300, message 1316 may be a radio resource control connection reconfiguration message and convey mobility control information to the UE 10. As illustrated by step 1317, the UE 10 may then detach from the cell of the second BS 120 and synchronize to the cell of the first BS 110. The second BS 120 may then send status information to the first BS 110, using message 1318.

As illustrated by message 1319, the second BS 120 may then start forwarding downlink user plane data to the first BS 110. Here, it is to be understood that it is the first BS 110 which in turn forwards such downlink user plane data to the second BS 120.

By sending message 1320 to the first BS 110, the UE 10 then again sets up a connection to the first BS 110. After this, uplink user plane data can be conveyed directly via the first BS 110 to the gateway 350, as illustrated by messages 1321 and 1322.

At step 1323, the first BS 110 detects the formation of a forwarding loop between the first BS 110 and the second BS 120. This is accomplished on the basis of the anchor identifier received from the second BS 120 in message 1314. In particular, the second BS 120 may determine that the anchor identifier is the same as provided to the second BS 120 in message 1301.

In the scenario of FIG. 13, since the number of forwarding hops is limited to a maximum of two hops, the first BS 110 can remove the detected forwarding loop by stopping forwarding with respect to the second BS 120 and releasing the corresponding resources and context, as indicated in step 1324.

Having removed the forwarding loop, downlink user plane data can be conveyed from the gateway 350 to the first BS 110 and then forwarded directly to the UE 10 as illustrated by messages 1325 to 1326.

Execution of the second handover is then completed by the first BS 110 sending message 1327 to the second BS 120, to initiate releasing of UE resources at the second BS 120.

Message 1327 may be UE context release message in accordance with 3GPP TS 23.401 and 36.300. The message 1327 may include an indication of required forwarding loop removal, e.g., in the form of a flag.

Upon receiving message 1327, the second BS 110 releases resources related to the UE 10, as indicated by step 1328 and, in response to the indication in message 1327, stops forwarding and releases the resources and context associated with the forwarding. The latter procedures may be delayed by a configurable time interval to account for delays in the forwarded user plane and/or control plane data and to allow for reordering of data packets.

The above concepts of delaying handover notification at the target BS may also be considered in procedures for releasing a user plane and control plane connection of the UE 10, e.g., an S1 connection. If the above option of forwarding the control plane data between the BSs is used, also the control plane data associated with the signalling for releasing the connection may be forwarded in the same manner. Corresponding procedures are illustrated in the exemplary timing diagram of FIG. 14.

Figure 14:
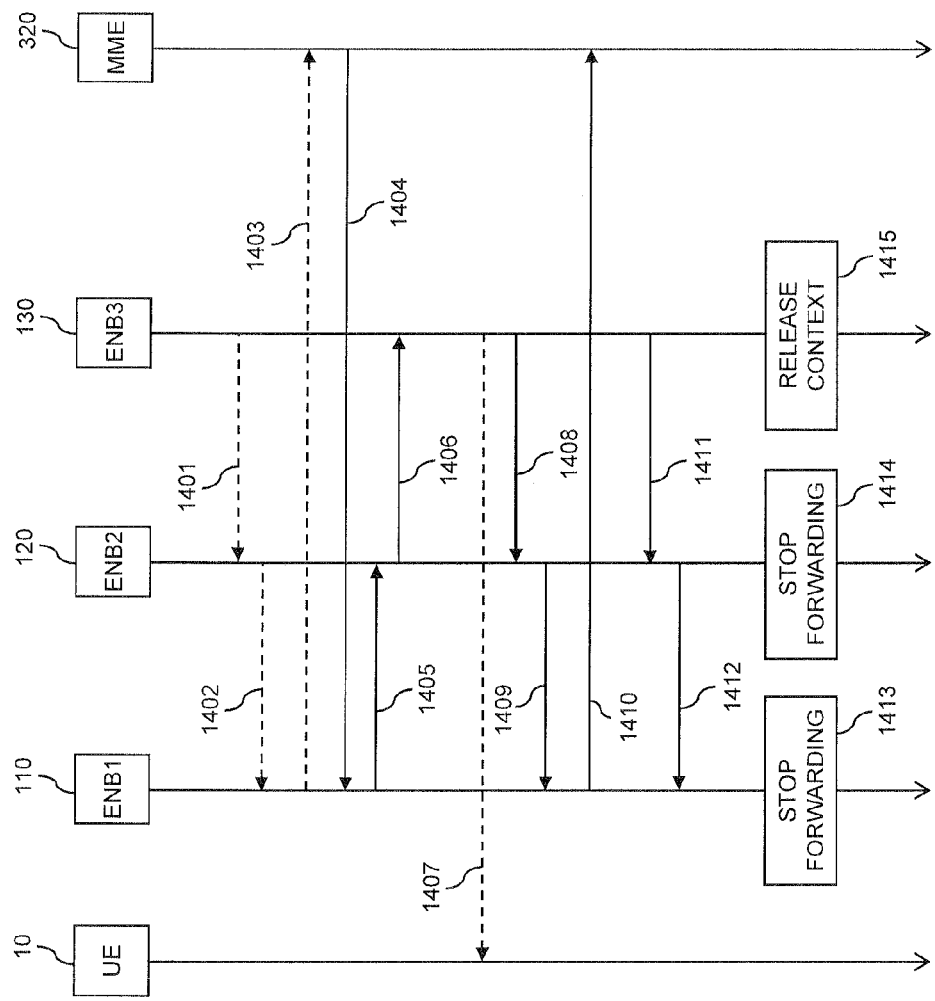
FIG. 14 shows a timing diagram for illustrating exemplary procedures for releasing a connection according to an embodiment of the invention.

The procedures of FIG. 14 involve the UE 10, the first BS 110, the second BS 120, the third BS 130, and the control node 320. In the illustrated scenario, it is assumed that the UE 10 performed a first handover from the first BS 110 to the second BS 120 and then a second handover from the second BS 120 to the third BS 130, so that the UE 10 is connected to the third BS 130, but the core network, in particular the control node 320, is still connected to the first BS 110. That is to say, the control plane connection between the third BS 130 and the control node 320 is established via the second BS 120 and the first BS 110, using forwarding of control plane data over the inter-BS interfaces.

For sending a request for releasing connection of the UE 10 to the control node 320, e.g., a UE Context Release Request of the S1-MME interface, the third BS 130 includes this request into message 1401, which is sent from the third BS 130 to the second BS 120. The second BS 120 forwards the request to the first BS 110, using message 1402, and the first BS 110 forwards the request to the control node 320, using message 1403.

The control node 320 then responds to the request by sending message 1404 to the first BS 110. The response of message 1404 may for example include a UE Context Release Command of the S1-MME interface.

The first BS 110 forwards the response to the second BS 120, as indicated by message 1405, and the second BS 120 forwards the response to the third BS 130, as indicated by message 1406.

The third BS 130 may then perform releasing of radio resources related to the UE 10. This may involve sending message 1407 to the UE 10. For example, message 1407 may be a RRC resource release message.

The third BS 130 may then inform the control node 320 of having completed the control plane context release, by including a corresponding notification into message 1408, which is sent from the third BS 130 to the second BS 120. The second BS 120 forwards the notification to the first BS 110, using message 1409, and the first BS 110 forwards the notification to the control node 320, using message 1410. The notification may be a UE Context Release Complete message of the S1-MME interface.

The third BS 130 then instructs the second BS 120 to stop forwarding control plane data by including a corresponding command into message 1411, which is sent from the third BS 130 to the second BS 120. The second BS 120 forwards the command to the first BS 110, using message 1412. In some scenarios, the command may also be included in messages 1408 and 1409.

In response to the command, the second BS 120 and the first BS 110 stop forwarding of control plane data over the inter-BS interface and can release the corresponding context and resources, as indicated by steps 1413 and 1415. At step 415, the third BS 130 may release all resources related to the UE 10, including the context maintained for the forwarding of control plane data over the inter-BS interface.

In the above concepts involving delaying of the handover notification at the target BS, cooperation between the involved BSs may be required. In such cases, support of the required functionalities may be verified by the BSs. For example, the support may be negotiated when setting up a connection via the inter-BS interface or when exchanging the handover request message and handover request acknowledgement messages. Further, information whether a certain neighboring BS supports the functionalities or not may also be statically configured in the BSs, e.g., using OAM procedures. If the required functionalities are not supported by a neighboring BS, the target or source BS may refrain from applying the concepts when performing a handover with respect to this neighboring BS.

If in a sequence of handovers forwarding of user plane data and/or control plane data is performed as described above, and the UE 10 then performs a handover from a source BS supporting the required functionalities to a target BS not supporting the required functionalities, the source BS may detect that the target BS does not support the required functionalities and notify the forwarding BSs of the sequence accordingly, so that these BS can stop forwarding and release the corresponding resources and context of the inter-BS interface. In some scenarios, the stop of forwarding and release of the context and resources may also be controlled by the forwarding timer and associated forwarding time period $T_f$.

In some situations, a handover may not progress regularly, and radio link failures may occur. Generally, such failures may be handled in accordance with existing methods, e.g., as described in 3GPP TS 36.300.

In the case of a radio link failure to a prepared target BS, i.e., if the handover to the target BS was prepared by handover request and acknowledgement, but execution fails due to a failure in establishing the radio link between the UE 10 and the target BS, the target BS can notify the source BS accordingly so that the source BS can stop forwarding and release the corresponding context and resources of the inter-BS interface. The notification may also be forwarded to other forwarding BSs of a sequence of handovers for stopping the forwarding and releasing the corresponding contexts and resources. In some scenarios, the stop of forwarding and release of the context and resources may also be controlled by the forwarding timer and associated forwarding time period $T_f$. Further, also the core network 300, in particular the control node 320, may be notified about the status of the UE 10 after the failure.

Further, also a radio link failure to an unprepared target BS may occur. In this case there is no preceding handover request and acknowledgement, which may occur when the UE 10 moves to the target BS in idle mode and then attempts connection, e.g., by issuing a service request. In such a case, the control node 320 may release the control plane and user plane connections to the source BS. The source BS may then notify other forwarding BSs of a sequence of handovers so that these BS can stop forwarding and release the corresponding resources and context of the inter-BS interface. In some scenarios, the stop of forwarding and release of the context and resources may also be controlled by the forwarding timer and associated forwarding time period $T_f$.

In the above concepts, a number of criteria may be used to control the delay of the handover notification from the target BS to the control node 320 and the extended forwarding of user plane data and/or control plane data.

The basic criterion is the delay time period T from the execution of the handover to the notification of the handover to the control node 320. By delaying the notification of the control node 320 until this delay time period T expires, a sequence of multiple handovers may cause only a single notification to the control node 320.

As a further criterion, a maximum number $P_{max}$ of handovers before notifying the control node 320 may be defined, e.g., by implementing a corresponding counter. If the number of handovers in a sequence of handovers reaches this maximum number $P_{max}$, the control node 320 may be notified even if the delay time period T has not yet expired. In this way, the number of hops for forwarding user plane data and/or control plane data can be limited. The counter value may be forwarded from the source BS to the target BS, e.g., in the UE context.

As a further criterion, a timeout $T_t$ on the basis of the total time since the notification of the last handover to the control node 320 may be used, e.g., by implementing a further timer. Upon reaching the timeout $T_t$, the control node 320 may be notified even if the delay time period T has not yet expired. In this way, the notification of the control node 320 is not delayed more than $T_t$ even if there are multiple handovers within the delay time period T.

As already discussed above, it is possible to use explicit signalling for releasing the context and resources for forwarding on the inter-BS interface, or to use a timeout after the forwarding time period $T_f$ after which the resources and context are released without any explicit signalling. If the delay time period T is used in connection with the maximum number of handovers $P_{max}$, the forwarding time period $T_f$ can be set to be at least $T_f = T \times P_{max}$. If the delay time period T is used in connection with the timeout $T_t$, the forwarding time period $T_f$ can be set to be at least $T_f = T_t$.

The values for T, $P_{max}$, and $T_t$ may differ between different BSs of the mobile network. These values may be statically configured in the BS. Further, these values could be dynamically obtained either through provisioning over an external interface or through a self learning system in the BS, thereby allowing for an effective balancing between on the one hand handover related signalling load and on the other hand forwarding related load on the inter-BS interfaces.

Also when delaying the handover notification at the target BS, it may be useful to restart the timer or timers and/or the counter of notified handovers when the UE 10 returns to an earlier BS of a sequence of handovers, i.e., when a forwarding loop is detected. In this way the signalling reduction in the case of ping-pong or loop behaviour can be further improved.

As mentioned above, the anchor identifier may be used for the detection of forwarding loops. The anchor identifier may be stored in the UE context and forwarded to the target BS during handover. Additionally or as an alternative, also identifiers of the BSs of a sequence of handovers may be recorded and forwarded to the target BS as the UE 10 moves through the sequence. For this purpose, each BS may add its identifier to a list and forward the list to the nest target BS, e.g., in the UE context. This may facilitate detection of a forwarding loop, because the target BS only needs to recognize its own identifier in the list received from the source BS in order to detect the forwarding loop.

In the above, concepts were described which are based on either delaying the handover notification in the RAN 100, i.e., at the target BS, or on delaying the handover notification in the core network 300, i.e., at the control node 320. However, it is also possible to combine these concepts in the same mobile network. For example, in some domains of the mobile network the delay could be implemented in the RAN 100, and in other domains it could be implemented in the core network 300. Further, in view of efficiency, the application of the delay could in each case be limited to specific situations. For example, the delay could be applied only for UEs with only non-guaranteed bitrate bearers. This helps to facilitate network dimensioning, because guaranteed bitrate bearers require resource reservation in the transport network which may become more complex when extended forwarding of user plane data is applied. Further, the delay could be applied only for UEs which have a handover rate exceeding a certain threshold. The threshold for the handover rate may be configurable. For UEs with high handover rate, application of the delay is specifically beneficial because a considerable reduction of the signalling load can be achieved.

Figure 15:
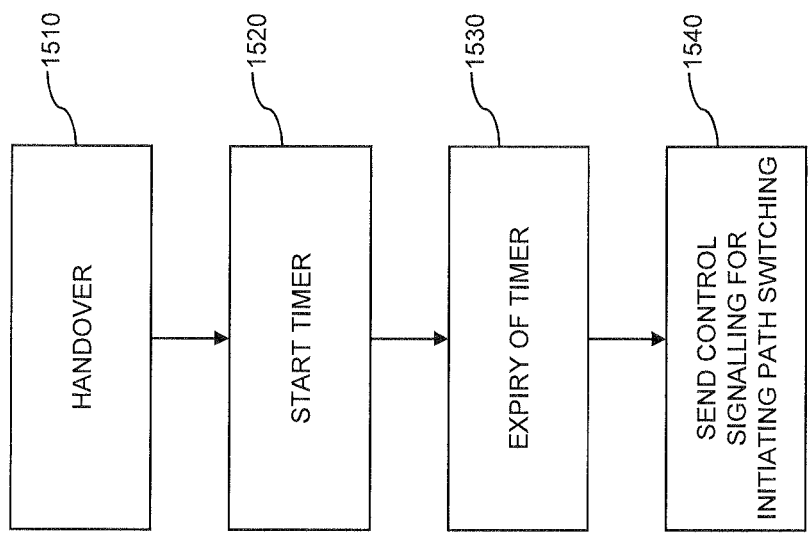
FIG. 15 shows a flowchart for illustrating a method according to an embodiment of the invention.

FIG. 15 shows a flowchart for illustrating a method for handover signalling. The method may be used for implementing the above concepts in a node of a mobile network, e.g., in a control node of the mobile network, such as the control node 320 of the above scenarios, or in a BS of the mobile network, such as the target BS 120 or 130, in the above scenarios.

At step 1510, a handover of the UE, e.g., the UE 10, from a source BS to a target BS is performed. The source BS and the target BS may for example correspond to a pair of BSs in the above described scenarios, e.g., to the BSs 110 and 120 or to the BSs 120 and 130. 2. If the node corresponds to the control node the handover may be notified to the control node by a path switch request from the target BS, such as by message 213 of FIG. 2, by message 515 of FIG. 5, or by message 613 or 630 of FIG. 6. If the node corresponds to the target BS, such notification of the handover is not needed, because the target BS itself may determine that execution of the handover is completed.

At step 1520, the node of the mobile network starts a timer, which expires at step 1530. The timer has the purpose of delaying notification of the handover by the node. The duration of the timer may be configurable. For example, the node may receive configuration data, e.g., through a OAM procedure, and control the duration of the timer on the basis of the configuration data.

At step 1540, after expiry of the timer, the node sends control signalling for initiating path switching to a data path connecting the target BS to a gateway of the mobile network. If the node corresponds to the control node, the control signalling may comprise a modify bearer request to the gateway. Examples of such modify bearer requests are message 218 of FIG. 2 and message 520 of FIG. 5. If the node corresponds to the target BS, the control signalling may comprise a path switch request to a control node of the mobile network, e.g., to the control node 320. Examples of such a path switch request are message 716 of FIG. 7 and message 818 of FIG. 8.

Before expiry of the timer but after setting up a connection between the UE and the target BS, if the node corresponds to the target BS, the target BS may send uplink control plane data via the source BS to the control node. Further, the target BS may receive downlink control plane data via the source BS from the control node. Examples of such forwarding of control plane data are illustrated in FIG. 9. Also, if the node corresponds to the target BS, if a need to transmit control plane data between the target BS and the control node arises, the target BS may send the control signalling irrespective of expiry of the timer.

Before expiry of the timer but after setting up a connection between the UE and the target BS, the target BS may receive downlink user plane data from the source BS and forward the received downlink user plane data to the UE, e.g., as illustrated by messages 210, 211, 212, of FIG. 2, messages 511, 512, 513, 514 of FIG. 5, messages 610, 611, 612, 626, 627, 628, 629 of FIG. 6, messages 710, 711, 712 of FIG. 7, messages 811, 812, 813, 814 of FIG. 8, messages 1213, 1214, 1215, 1216, 1217 of FIG. 12, or messages 1310, 1311, 1312 of FIG. 13.

The method may also include a further handover from a further BS to the source BS, e.g., the handover from the first BS 110 to the second BS 120 in the scenario of FIG. 3. That is to say, there may be a sequence of handovers between multiple BSs, and these handovers may take place before expiry of the timer. In such scenarios, there may be forwarding of user plane data and/or control plane data the further BS and the target BS via the source BS, e.g., as illustrated in FIG. 3. The node may then obtain information for identifying the further base station, e.g., by means of the anchoring identifier described in connection with FIGS. 12 and 13 or by means of BS identities as described in connection with FIG. 6. On the basis of the obtained information, the node may then detect the formation of a forwarding loop, i.e., that the UE returned to an earlier BS in the sequence of handovers.

In some scenarios, forwarding of user plane data and/or control plane data may also be accomplished directly between the further BS and the target BS, e.g., as illustrated in FIG. 4.

Figure 16:
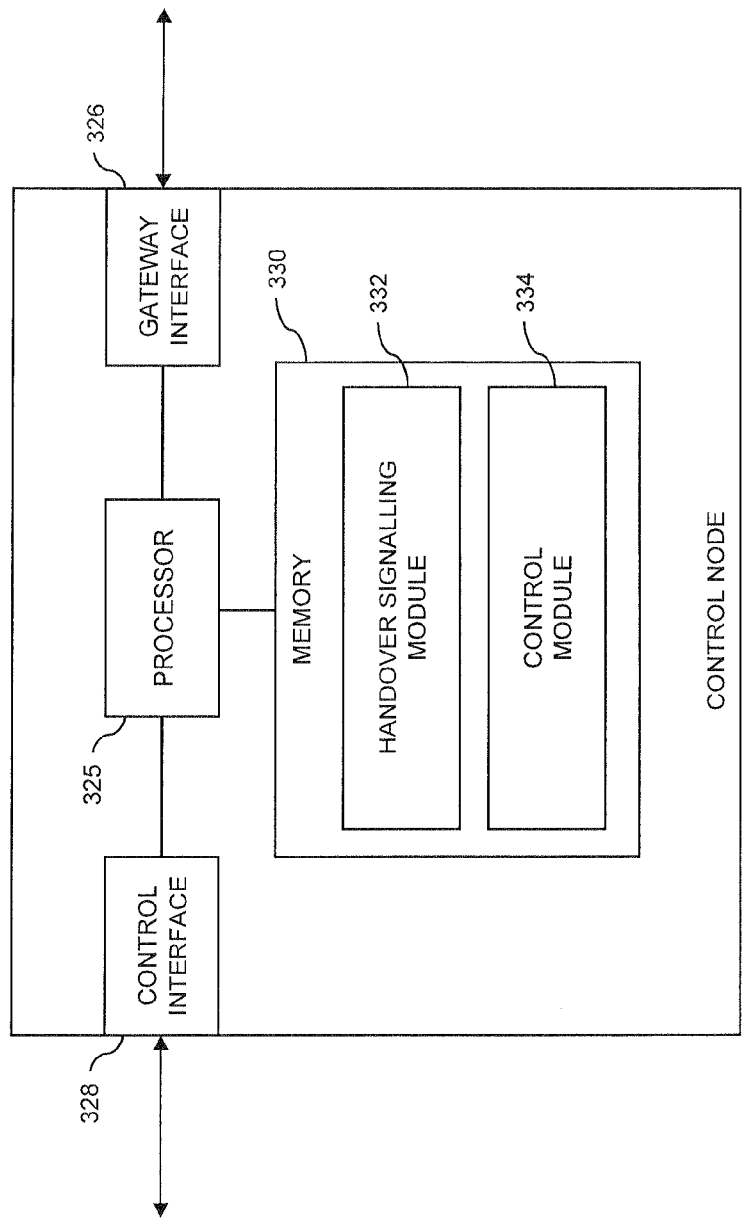
FIG. 16 schematically illustrates a control node according to an embodiment of the invention.

FIG. 16 schematically illustrates exemplary structures for implementing the above-described concepts in a control node, e.g., in the control node 320 of the above scenarios. As mentioned above, the control node may be implemented as an MME.

In the illustrated structure, the control node includes a control interface 328 for communicating with BSs of the mobile network, e.g., implemented as eNBs. The control interface 328 may for example be implemented as the S1-MME interface. Further, the control node includes a gateway interface 326 for communicating with a gateway of the mobile network, e.g., an SGW. For example the gateway may correspond to the gateway 350 of the above scenarios. The gateway interface 326 may be implemented as the S11 interface.

Further, the control node includes a processor 325 and a memory 330. The processor 325 is coupled to the gateway interface 326 and to the control interface 328, and the memory is coupled to the processor 325. The memory 160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 330 includes suitably configured program code to be executed by the processor 325 so as to implement the above-described functionalities of the control node. More specifically, the memory 330 may include a handover signalling module 332 for performing the above-described handover related signalling with respect to BSs and the gateway. This may in particular include the delaying of the handover notification to the gateway, using the timer associated with the delay time period T. Further, the memory 330 may include a control module 334 for performing various control procedures, e.g., related to connection setup and mobility of a UE.

It is to be understood that the structure as illustrated in FIG. 16 is merely schematic and that the control node may actually include further components which, for the sake of clarity, have not been illustrated, e.g., further interfaces or additional processors. Also, it is to be understood that the memory 330 may include further types of program code modules, which have not been illustrated. For example, the memory 330 may include program code modules for implementing typical functionalities of a control node, e.g., known functionalities of an MME. According to some embodiments, also a computer program product may be provided for implementing concepts according to embodiments of the invention, e.g., a computer-readable medium storing the program code and/or other data to be stored in the memory 330.

Figure 17:
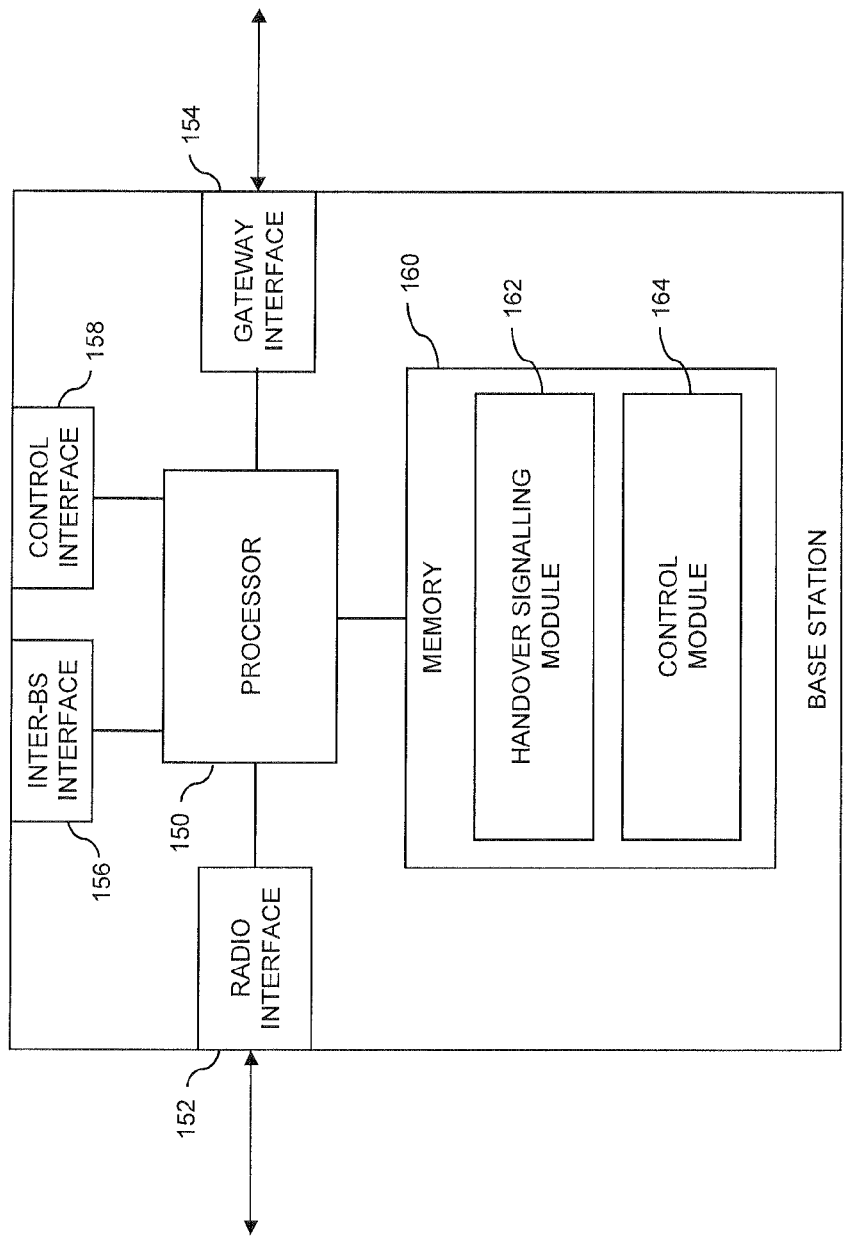
FIG. 17 schematically illustrates a base station according to an embodiment of the invention.

FIG. 17 schematically illustrates exemplary structures for implementing the above-described concepts in a BS, e.g., the BS 110, 120 or 130 of the above scenarios. As mentioned above, the BS may be implemented as an eNB.

In the illustrated structure, the BS includes a radio interface 152, a gateway interface 154, an inter-BS interface 156, and a control interface 158. The radio interface 152 may be used for connecting to the UE, e.g., the UE 10. The gateway interface 154 may be used for conveying user plane data to or from a gateway of the mobile network, e.g., the gateway 350. The inter-BS interface 156 may be used for connecting to other BSs, e.g., for the purpose of performing handover related signalling as described above or for the purpose of forwarding user plane data and/or control plane data. The control interface 158 may in turn be used for conveying control plane data to or from a control node of the mobile network, e.g., the control node 320. The radio interface may be implemented as the Uu radio interface, the gateway interface 154 may be implemented as the S1-U interface. The inter-BS interface 156 may be implemented as the X2 interface, and the control interface 158 may be implemented as the S1-MME interface.

Further, the gateway includes a processor 150 coupled to the interfaces 152, 154, 156, 158 and a memory 160 coupled to the processor 150. The memory 160 may include a ROM, e.g., a flash ROM, a RAM, e.g., a DRAM or SRAM, a mass storage, e.g., a hard disk or solid state disk, or the like. The memory 160 includes suitably configured program code to be executed by the processor 150 so as to implement the above-described functionalities of the BS. More specifically, the memory 160 may include a handover signalling module 162 for performing the above-described handover related signalling with respect to the control node and other BSs. This may in particular include the delaying of the handover notification to the control node, using the timer associated with the delay time period T, or performing forwarding of user plane data and/or control plane data to or from other BSs. Further, the memory 160 may include a control module 164 for performing various control procedures, e.g., control of handover related procedures such as establishment or releasing of connections or control of radio resources assigned to the UE.

It is to be understood that the structure as illustrated in FIG. 17 is merely schematic and that the BS may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS, e.g., known functionalities of an eNB. According to some embodiments, also a computer program product may be provided for implementing concepts according to embodiments of the invention, e.g., a computer-readable medium storing the program code and/or other data to be stored in the memory 160.

As can be seen, concepts as described herein may be used to reduce the handover related signalling load in the mobile network, in particular at a control node such as an MME of the EPC or at a gateway such as the SGW of the EPC. This in turn may allow for a more efficient deployment of the mobile network and for cost saving or increased capacity, e.g., in view of the number of UEs which can be served by a given infrastructure of the mobile network. The handover related signalling load may for example be reduced if a sequence of handovers takes place before the delay time period expires, so that only the last handover of the sequence needs to be signalled. Further, the handover related signalling load may be reduced if the UE returns to a previous BS of a sequence of handovers before the delay time period expires so that handover notification can be omitted. Further, the handover related signalling load may be reduced if a connection to the UE is released before the delay time period expires so that handover notification can be omitted. If the delay is implemented in the control node, the concepts can be implemented without significant impact on the RAN which only needs to support extended forwarding between the BSs. If the delay is implemented in the target BS, the concepts can be efficiently implemented without further impact on the core network.

It is to be understood that the concepts as explained above are merely exemplary and susceptible to various modifications. For example, the concepts may be applied in various types of mobile networks which are based on different types of radio access technology. Further, it is to be understood that the illustrated nodes may each be implemented by a single device or by multiple devices. Moreover, the concepts may be implemented by dedicated hardware and/or by software to be executed by a multipurpose processor in one of the involved nodes.

The invention claimed is:

1. A method of signalling a handover of a user equipment in a mobile network, the method comprising:
    starting a timer by a target base station of the mobile network in response to the handover of the user equipment from a source base station to the target base station;
    before the expiry of the timer but after setting up a connection between the user equipment and the target base station, receiving, by the target base station, downlink control plane data from a control node via the source base station; and
    sending, based on the expiry of the timer and by the target base station node, control signalling, comprising a path switch request, to the control node for initiating switching transmission of data between a gateway and the user equipment from a first data path which connects the source base station and the gateway to a second data path which connects the target base station and the gateway.

2. The method according to claim 1,
    wherein the control node is different from the source base station, the target base station, and the gateway,
    wherein the control node is notified of the handover by the path switch request from the target base station; and
    wherein the control signalling comprises a modify bearer request to the gateway.

3. The method according to claim 1, further comprising:
    before expiry of the timer but after setting up the connection between the user equipment and the target base station, sending, by the target base station, uplink control plane data to the control node via the source base station.

4. The method according to claim 1, further comprising:
    in response to a determination of a need for transmitting control plane data between the target base station and the control node, sending, by the target base station, the control signalling to the control node irrespective of the expiry of the timer.

5. The method according to claim 1, further comprising:
    before expiry of the timer but after setting up the connection between the user equipment and the target base station, receiving, by the target base station, downlink user plane data from the source base station and forwarding the received downlink user plane data to the user equipment.

6. The method according to claim 1, further comprising:
    receiving, by the target base station, signalling indicating a handover of the user equipment from a further base station to the source base station.

7. The method according to claim 6, further comprising:
    forwarding of user plane data and/or control plane data between the further base station and the target base station via the source base station.

8. The method according to claim 7, further comprising:
    obtaining, by the base station of the mobile network, information for identifying the further base station; and
    detecting, by the target base station of the mobile network and based on the information, formation of a forwarding loop.

9. The method according to claim 7, further comprising:
    forwarding of user plane data and/or control plane data directly between the further base station and the target base station.

10. The method according to claim 1, further comprising:
    receiving, by the target base station, configuration data; and
    controlling, by the target base station and based on the configuration data, a duration of the timer.

11. A target base station of a mobile network, comprising:
    an interface configured to signal a handover of a user equipment; and
    a processor,
    wherein the processor is configured to:
    start a timer in response to the handover of the user equipment from a source base station to the target base station,
    before expiry of the timer but after setting up a connection between the user equipment and the target base station, send station uplink control plane data via the source base station to a control node, and
    based on the expiry of the timer, control the interface to send control signalling comprising a path switch request to the control node for initiating switching transmission of data between a gateway and the user equipment from a first data path which connects the source base station and the gateway to a second data path which connects the target base station and the gateway.

12. The target base station according to claim 11, wherein the control node is different from the source base station, the target base station, and the gateway.

13. A method of signalling a handover of a user equipment in a mobile network, the method comprising:
    starting a timer by a target base station of the mobile network in response to the handover of the user equipment from the user equipment from a source base station to the target base station;
    before expiry of the timer but after setting up a connection between the user equipment and the target base station, sending, by the target base station, uplink control plane data to a control node via the source base station; and
    sending, based on expiry of the timer and by the target base station, a path switch request to the control node for initiating switching to a data path which connects the target base station and a gateway.

14. The method of claim 13, further comprising:
    before expiry of the timer but after setting up the connection between the user equipment and the target base station, receiving, by the target base station, downlink control plane data from the control node via the source base station.

15. The method of claim 13, wherein the control node is different from the gateway.

16. The method according to claim 13, further comprising:
- receiving, by the target base station, configuration data; and
- controlling, by the target base station and based on the configuration data, a duration of the timer.

* * * * *